(12) United States Patent
Adnani et al.

(10) Patent No.: US 8,675,781 B2
(45) Date of Patent: Mar. 18, 2014

(54) RADIO FREQUENCY RECEIVER SYSTEM FOR WIDEBAND SIGNAL PROCESSING

(75) Inventors: Nikhil Adnani, Ottawa (CA); Gilbert Brunette, Ottawa (CA); Tim Hember, Ottawa (CA)

(73) Assignee: ThinkRF Corporation, Ottawa (CA)

( * ) Notice: Subject to any disclaimer, the term of this patent is extended or adjusted under 35 U.S.C. 154(b) by 0 days.

(21) Appl. No.: 13/604,764

(22) Filed: Sep. 6, 2012

(65) Prior Publication Data
US 2013/0064328 A1    Mar. 14, 2013

Related U.S. Application Data

(60) Provisional application No. 61/532,191, filed on Sep. 8, 2011.

(51) Int. Cl.
*H04L 27/06* (2006.01)
(52) U.S. Cl.
USPC ........... 375/340; 375/238; 375/239; 375/242; 375/256; 375/257; 375/324; 375/353
(58) Field of Classification Search
CPC ..... H04L 25/067; H04L 1/0045; H04L 1/005; H04L 1/0054
USPC ......... 375/340, 136, 147, 238, 239, 242, 256, 375/257, 286, 353; 455/313, 318; 329/300, 329/304, 311
See application file for complete search history.

(56) References Cited

U.S. PATENT DOCUMENTS

| | | | |
|---|---|---|---|
| 6,714,605 B2 | 3/2004 | Sugar | |
| 6,816,715 B1 | 11/2004 | Mano | |
| 6,850,735 B2 | 2/2005 | Sugar | |
| 7,035,593 B2 | 4/2006 | Miller | |
| 7,110,756 B2 | 9/2006 | Diener | |
| 7,116,943 B2 | 10/2006 | Sugar | |
| 7,142,108 B2 | 11/2006 | Diener | |
| 7,171,161 B2 | 1/2007 | Miller | |
| 7,184,777 B2 | 2/2007 | Diener | |
| 7,224,752 B2 | 5/2007 | Sugar | |
| 7,254,191 B2 | 8/2007 | Sugar | |
| 7,292,656 B2 | 11/2007 | Kloper | |
| 7,298,129 B2 | 11/2007 | Bernard | |
| 7,471,652 B2 | 12/2008 | Bernard | |
| 7,558,582 B2* | 7/2009 | Karlsson | 455/456.1 |
| 7,606,335 B2* | 10/2009 | Kloper et al. | 375/340 |
| 7,724,717 B2 | 5/2010 | Porras | |
| 7,734,464 B2 | 6/2010 | Bernard | |
| 7,835,319 B2 | 11/2010 | Sugar | |

(Continued)

*Primary Examiner* — Dhaval Patel
(74) *Attorney, Agent, or Firm* — The Law Office of Michael E. Kondoudis

(57) ABSTRACT

Wireless communication is ubiquitous today and deployments are growing rapidly leading to increased interference, increasing conflicts, etc. As a result monitoring the wireless environment is increasingly important for regulators, service providers, Government agencies, enterprises etc. Such monitoring should be flexible in terms of the networks being monitored within the wireless environment but should also provide real-time monitoring to detect unauthorized transmitters, provide dynamic network management, etc. Accordingly, based upon embodiments of the invention, a broadband, real-time signal analyzer (RTSA) circuit that allows for the deployment of RTSA devices in a distributed environment wherein determination of policy breaches, network performance, regulatory compliance, etc. are locally determined and exploited directly in network management or communicated to the central server and network administrators for subsequent action. Beneficially the RTSA exploits a broadband RF front end in conjunction with parallel direct down conversion and FFT techniques.

11 Claims, 19 Drawing Sheets

(56) References Cited

U.S. PATENT DOCUMENTS

| | | |
|---|---|---|
| 7,869,785 B2 | 1/2011 | Karlsson |
| 7,873,486 B2 | 1/2011 | Earls |
| 7,957,938 B2 * | 6/2011 | LaMarche et al. ............ 702/189 |
| 8,014,366 B2 * | 9/2011 | Wax et al. .................... 370/338 |
| 2003/0198200 A1 | 10/2003 | Diener |
| 2003/0198304 A1 | 10/2003 | Sugar |
| 2004/0028123 A1 | 2/2004 | Sugar |
| 2004/0137915 A1 | 7/2004 | Diener |
| 2004/0208239 A1 | 10/2004 | Karlsson |
| 2005/0002473 A1 * | 1/2005 | Kloper et al. ................ 375/316 |
| 2005/0207512 A1 | 9/2005 | Earls |
| 2006/0212929 A1 | 9/2006 | Karlsson |
| 2007/0287395 A1 | 12/2007 | Karlsson |
| 2008/0019464 A1 | 1/2008 | Kloper |
| 2008/0082278 A1 | 4/2008 | Tan et al. |
| 2008/0258706 A1 | 10/2008 | Bernard |
| 2009/0310661 A1 | 12/2009 | Kloper |
| 2010/0124886 A1 | 5/2010 | Fordham |
| 2010/0184395 A1 | 7/2010 | Bagge |
| 2010/0204938 A1 | 8/2010 | Hillman, Jr. |
| 2010/0204939 A1 | 8/2010 | Hillman, Jr. |
| 2010/0231398 A1 | 9/2010 | Engholm |
| 2010/0304703 A1 | 12/2010 | Han |

* cited by examiner

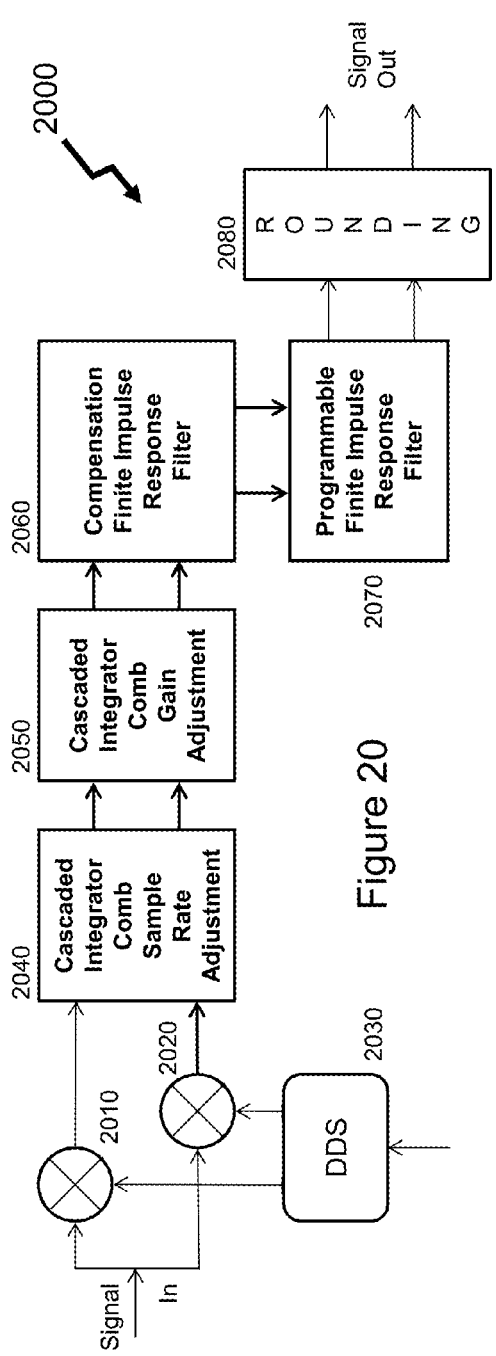
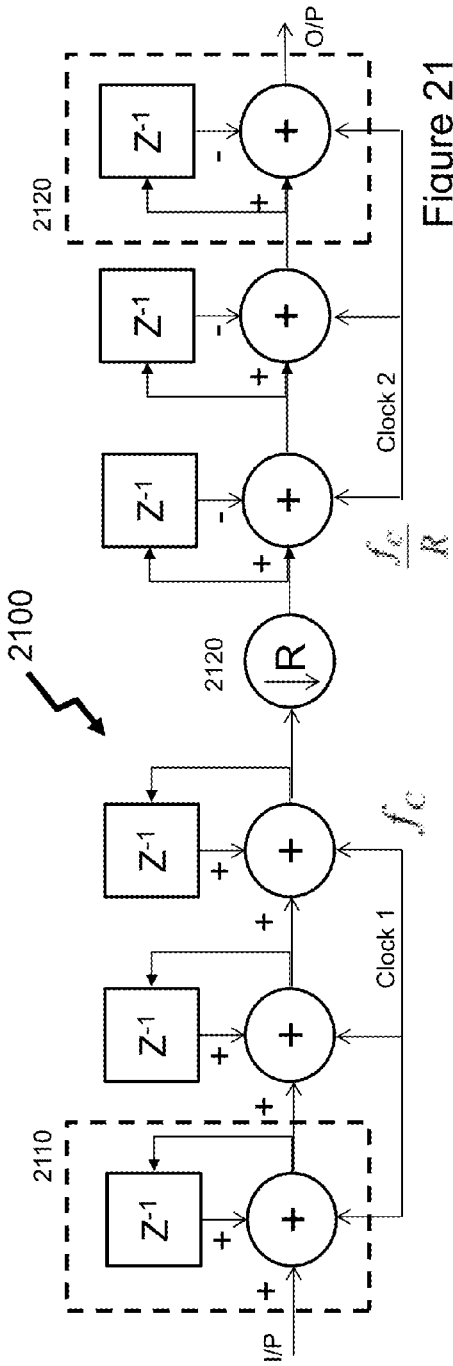
Figure 20
Figure 21

RADIO FREQUENCY RECEIVER SYSTEM FOR WIDEBAND SIGNAL PROCESSING

CROSS-REFERENCE TO RELATED APPLICATIONS

This patent application claims the benefit of U.S. Provisional Patent Application U.S. 61/532,191 filed Sep. 8, 2011 entitled "Radio Frequency Receiver System for Wideband Signal Processing" the entire contents of which are incorporated herein by reference.

FIELD OF THE INVENTION

This invention relates to RF receivers and more specifically to broadband front-end receivers for real-time signal analysis.

BACKGROUND OF THE INVENTION

Wireless communication is ubiquitous and deployments are growing rapidly. In 2008 the International Telecommunication Union estimated the number of mobile telephones at 4.1 billion with a worldwide population of approximately 6.8 billion people (ITU Corporate Annual Report, http://www.itu.int/dms_pub/itu-s/opb/conf/S-CONF-AREP-2008-E06-PDF-E.pdf). Portio Research estimates the number of mobile telephones will grow to 5.8 billion by 2013, fueled by Asia-Pacific particularly, which by 2013 will account for 43.9 percent of subscribers, followed by Europe (25.0 percent), Africa and Middle East (12.2 percent), Latin America (11.2 percent) and North America (7.6 percent) ("Mobile Factbook 2009" http://www.portiodirect.com/productDetail.aspx?pid=49$55$51$431). By 2014, global mobile Internet users expected to send and receive 1.6 Exabytes of mobile data each month, which is more than the 1.3 Exabytes transferred during the whole of 2008, according to ABI Research (http://www.abiresearch.com/press/1466-In+2014+Monthly+Mobile+Data+Traffic+Will+Exceed+2008+Total).

Cellular phones are evolving into hand-held computers with voice, data and video multimedia applications and accordingly, there is the associated increasing demand for more bandwidth. IDC estimates the annual shipment of Bluetooth-enabled devices as 1.2 billion devices and growing with 20% CAGR (http://www.idc.com/getdoc.jsp?sessionId=&containerId=219098&sessionId=UDMGOJ2XGTN JMCQJAFICFGAK-BEAUMIWD). In-Stat estimates the annual shipment of WLAN-enabled devices is 380 million and growing 24% CAGR ("Global Wi-Fi Chipset Forecast and Analysis: 2007 to 2013" http://www.instat.com/abstract.asp?id=167&SKU=IN0904005 WS). Additionally, the cost of deploying a wireless system is decreasing by half compounded every five years (The Economist, Apr. 10, 2008).

By contrast the wireless spectrum is a scarce and limited resource allocated in to many different communications and RF applications with only a few small segments for the many different communication uses associated with wireless devices by consumers and business users (see for example www.ntia.doc.gov/osmhome/allochrt.pdf). The recent auction of spectrum in the US provides a good indication of spectrum scarcity and resulting value where in 2008, the US Federal Communications Commission (FCC) auctioned a relatively tiny 62 MHz segment of spectrum across the United States for a total of US$19.6B (http://wireless.fcc.gov/auctions/default.htm?job=auction_summary&id=73) to a collection of telecommunications service providers including Verizon and AT&T. This spectrum was made available as a result of the digital television (DTV) transition away from analog TV (http://en.wikipedia.org/wiki/United_States_2008_wireless_spectrum_auction).

To satisfy the increasing demands for performance and throughput, wireless physical layer designs are becoming increasingly complex. It has been nearly thirty years since the first commercial wireless network using frequency division multiple access, so-called 1G technology was developed. Next came time division multiple access (TDMA) in 2G Global System for Mobile Communications (GSM) systems in the 1990s followed by code division multiple access (CDMA) in 3.xG systems in the early 2000s. 4G networks of Long Term Evolution (LTE) and WiMAX are currently in the planning and deployment stages and the next generation wireless local area network (LAN) 802.11n systems are pushing throughput towards 100 Mbps with Multiple-Input-Multiple-Output (MIMO) and orthogonal frequency division multiple access (OFDMA) approaches. Such modern wireless communication systems employ sophisticated RF technologies that include frequency hopping, complex modulation and packet-based transmission formats. These new data-centric wireless systems are complex to deploy, operate, maintain and monitor.

Wireless communications are increasingly subjected to radio interference. As the density of wireless devices increases so does the density of wireless base stations. To satisfy a city of millions of cellular users, each with increased cellular usage, requires a progressively denser mesh of cellular base stations, and these increasingly interfere with each other. Simultaneously corporations are increasingly deploying or expanding wireless networks. Wireless 802.11 LAN occupies the same spectrum as Bluetooth, cordless phones and microwave ovens and "must accept any interference" (en.wikipedia.org/wiki/ISM_band). In addition to these sources of unintentional interference there is the issue of RF devices transmitting with malicious intent and the requirement in some environments for real-time radio jamming of transmitter signals.

The rapid growth of deployments, scarcity of spectrum, complexity of solutions, congestion and interference are increasingly compounded problems for those deploying, managing, maintaining and monitoring wireless services. The wireless spectrum is a shared resource. Worldwide national governments not only license the use of the spectrum but must also police that spectrum. Policing ensures that those who are not authorized are not transmitting and those who have spent billions of dollars licensing portions of the spectrum have unencumbered access to those portions. Specifically, government agencies monitor the wireless spectrum within their countries to determine the occupancy within specific segments of the spectrum, to enforce allocation, to police issues pertaining to interference, and for a variety of other legal and strategic objectives.

Consequently this results in either the requirement to maintain and deploy expensive personnel and equipment to continually or periodically monitor wireless activity within a network or environment or a decision to not monitor and police the wireless spectrum. Accordingly it would be beneficial for a wide bandwidth, real-time spectrum analyzer to be provided supporting applications across geographically distributed and localized networks allowing enforcement and monitoring of regulated, sensitive, and/or problematic wireless environments Wireless communications and networks are deployed by telecommunications service providers, governments, corporations and the home user. Service providers are challenged by the compounding problems of increased number and density of users, increased user usage, and demands for increased bandwidth. The deployment, operation and maintenance of next generation wireless services are as a result increasing the demands for test, monitoring and "visibility" of the wireless physical layer without the similar deployment issues of deploying expensive personnel and/or equipment to at best accomplish intermittent and often inadequate monitoring. Corporate and government information technology (IT) groups face similar if not worse problems in the deployment, operation and maintenance of wireless networking infrastructure where common standards, such as IEEE 802.11, result in wireless products operating in unlicensed frequency bands. Such groups therefore not only faced with issues in installing wireless local area networks (WLANs) but supporting ongoing demand for density and bandwidth whilst reducing interference from a broad range of sources which may be transitory in nature and agile in frequency.

In addition to ensuring wireless connectivity, preventing wireless connectivity has also become an issue. A growing segment of large corporate and government departments for example require the enforcement of a no-wireless policy. A no-wireless policy is intended to prevent for example the inadvertent or malicious listening of sensitive, proprietary, confidential or secret information within meeting rooms via a cell phone or an eavesdropping device. Such policy enforcement is challenged by the breadth and complexity of wireless devices, which are evolving rapidly in terms of functionality, complexity and performance.

Applications for spectrum monitoring also extend to other environments, for example the battlefield. Equipping military personnel with the means to monitor and analyze their RF environment for communication activity, signal jammers and other threats is becoming a necessity in today's world of ubiquitous wireless devices, improvised explosive devices with remote triggers, etc.

Today, these varying regulators, service provider, and groups must either deploy laboratory or hand-held spectrum analyzers that are expensive, not designed for remote interconnected deployment and centralized management, and are not designed for real-time analysis of wireless signals or exploit hand-held spectrum/signal analyzers targeted to specific narrowband environments. Neither solution addresses the requirement for a compact, low cost, wide bandwidth, real-time spectrum analyzer that may be deployed in volume across geographic regions, and provides analysis of signals that in many instances are characterized by short duration, varying frequency through frequency hopping, arbitrary frequencies, intermittent operation, and which arise in-band or out-of-band with the normal environment of other wireless signals operating according to multiple protocols, often with high density.

There is also the requirement for such real-time spectrum analysis to operate in conjunction with wireless infrastructures that ranges from macrocells characterized by large antenna tower structures spaced many kilometers apart to picocells and femtocells where network access points, base stations, are meters or tens or meters apart. The applications of such real-time distributed spectrum analysis include interference detection, no-wireless or selective-wireless policy enforcement, spectrum management, signals intelligence (SIGINT), communications intelligence (COMINT), electronic intelligence (ELINT) and signal /interference analysis.

Accordingly it would be beneficial to provide regulatory authorities, service providers as well as network operators etc. with low cost, wide bandwidth, real-time network deployable spectrum analyzers allowing geographically distributed real-time monitoring as well localized monitoring functions to be implemented. Such low cost, wide bandwidth, real-time network deployable spectrum analyzers require a high performance, wideband, fast, programmable wide frequency range RF receiver. Wireless RF communications and other microwave applications range within the United States are covered by the FCC regulations up to 300 GHz (see http://www.ntia.doc.gov/osmhome/allochrt.html for allocations) although within this document for discussion purposes and by way of illustration a frequency range from 0.10 to 8 GHz will be considered.

Considering the prior art this currently is distributed between generally large RF test equipment, from companies such as Agilent, Tektronix, Anritsu, Ando, etc., allowing measurements and analysis over a wide frequency spectrum, for example 0 MHz-6000 MHz as well as variants for hand-held use and specific test equipment addressing a particular market with limited functionality and limited frequency range as well as being pre-programmed in terms of assumptions for that market whereas RF test equipment provides increased flexibility. Considering the later then typical examples include the hand-held Agilent N9342C Handheld Spectrum Analyzer (7 GHz) with a full-band sweep of approximately 400 ms (17.5 GHz/s tuning speed) and costing approximately $13,000 and the Agilent E4404B ESA-E Spectrum Analyzer (6.7 GHz) with improved noise performance albeit at reduced sweep speed for approximately $35,000. Retail prices for other laboratory spectrum analysers may rise from approximately $10,000 to over $100,000 per instrument according to bandwidth, noise floor, etc.

Such instruments exploit scanning RF receivers based upon super-heterodyne techniques that are well known in the prior art wherein the received RF signal (RF) is mixed with a local oscillator (LO), i.e. heterodyned, converted to an intermediate frequency (IF) and processed. In a spectrum analyzer the LO is swept across the band of interest at a predetermined rate according to scanned range, resolution bandwidth, etc. Typically, such spectrum analysers in order to provide high resolution employ narrow intermediate frequencies (the output frequency from the mixer combining the LO and RF signals) that may be for example 1 kHz, 100 Hz, or 1 Hz. Such low IF being achieved through multiple heterodyne stages with multiple LO signals. A classic super-heterodyne receiver according to the prior art, see for example Agilent Technologies Application Note 150 "Spectrum Analyser Basics" (http://cp.literature.agilent.com/litweb/pdf/5952-0292.pdf) as depicted by super-heterodyne receiver 1550 in FIG. 1B.

An alternative to super-heterodyne receivers is the direct-conversion receiver (DCR) that is much simpler to implement in integrated circuit form, see for example B. Razavi in "Design Considerations for Direct-Conversion Receivers" (IEEE Trans. Circuits & Systems II—Analog and Digital Signal Processing, Vol 44(6), pp. 428-435). In a DCR the RF band of interest is translated down to the baseband in only one conversion. Other names for this receiver architecture are zero-IF or homodyne. While the shortcomings of such receivers include DC and I/Q offsets in the baseband output, the main advantages are low-cost implementation and large instantaneous bandwidth. DCRs are typically found in high volume consumer device communications chipsets for applications such as Bluetooth (IEEE 802.15) and Wi-Fi (IEEE 802.11) with a constant frequency range of operation thereby limiting the impact of these shortcomings.

Signal analysis instrumentation includes for example the N9010A EXA Signal Analyzer (7 GHz) in a laboratory instrument retailing for approximately $35,000 with ability to implement pre-determined WLAN measurement applications or operate without them for more general signal analysis. Dedicated instruments include for example Fluke AirCheck™ Wi-Fi Tester for IEEE 802.11a/b/g/n networks which provides signal monitoring across Channels 1-14 in the 2.4 GHz band (2412-2484 MHz) but only Channels 34, 36, 38, 40, 42, 44, 46, 48, 52, 56, 60, 100, 104, 108, 112, 116, 120, 124, 128, 132, 136, 140, 149, 153, 157, 161, 165 in the 5 GHz Band (5170-5320 MHz, 5500-5700 MHz, and 5745-5825 MHz) but costs $2,000.

Others include for example Berkeley Varitronics Beetle for IEEE 802.11a/b/n/g and exploit typically identical RF receiver circuits as the portable wireless devices that access the networks these devices monitor but with dedicated network analysis software controlling the receiver or discrete circuits employing elements designed for use in network infrastructure elements where cost-performance tradeoffs are different to consumer ASICs for example. Accordingly such devices employ a transceiver such as depicted in FIG. 1B by transceiver 1000.

Within the prior art spectrum analysis has been the subject of substantial research and publications leading to continuous improvements and enhancements of commercial spectrum analysers from manufacturers such as Agilent, Tektronix, Anritsu, Ando, etc. Spectrum analyzers are used in a number of different applications including signals intelligence (SIGINT), communications intelligence (COMINT) and spectrum monitoring. For such applications, the emergence of complex modulation formats, frequency hopping waveforms and packet-based, intermittent transmissions in today's communications systems has led to the requirement to monitor the spectrum over a range of frequencies in a manner that all spectral activity is captured. Conventional swept-tuned Spectrum Analyzers typically performed non-coherent signal detection over a relatively small frequency range of interest.

A Realtime Spectrum Analyzer by comparison is one that is able to sample the incoming RF signal in the time domain and convert the information to the frequency domain using a Fast-Fourier Transform (FFT) process. The range of frequencies processed in one FFT calculation is limited to the instantaneous bandwidth of the receiver. The frequency range that is processed instantaneously can be ten or more times greater than that processed by a conventional spectrum analyzer. FFTs are processed in parallel, with no gaps and overlapped so there are no gaps in the calculation. As a result all signals that appear across the instantaneous bandwidth of the analyzer are detected. When monitoring a range of spectrum that exceeds the instantaneous bandwidth of the analyzer, that real-time display is really a series of discrete time specific measurements over different frequency ranges as evident from the teaching of K. Bernard in US Patent Application 2008/0,258,706 entitled "Wide-Bandwidth Spectrum Analysis of Transient Signals using a Real-Time Spectrum Analyzer". Bernard describes the real-time spectrum analyzer (RTSA) as operating by selection of a frequency window, the frequency window being narrower in bandwidth than the frequency spectrum of interest.

The RTSA is then successively tuned to a plurality of different frequencies within the frequency spectrum of interest, where such successive tuning is controlled based on a characteristic of the signal. The RF signal is received, and, for each of the plurality of different frequencies, power data is acquired for the signal in a band centered on the frequency and having a bandwidth equal to that of the frequency window. A representation of the frequency spectrum of interest is then constructed from the power data acquired during the successive tunings of the RTSA. Accordingly, it is necessary to know where the transient signal will appear in order for the RTSA of Bernard to capture information on the signal. It is also clear that a single transient pulse would not be captured in anything other than a measurement at the first tuned frequency of the RTSA.

Similarly, F. LaMarche et al in U.S. Pat. No. 7,957,938 entitled "Method and Apparatus for a High Bandwidth Oscilloscope utilizing Multiple Channel Digital Bandwidth Interleaving" teaches to a method of performing wide-band spectral analysis of transient signals wherein the analog signal spanning a frequency range into a plurality of frequency bands, and then translating at least one of the signals to a lower frequency band in accordance with a local oscillator and digitizing the at least one translated signal with digitizing elements having a frequency range less than the analog signal frequency range. LA Marches teaching that the sampled signal is then recirculated in a circular buffer with signals corresponding to the other of the plurality of frequency bands being similarly digitized and written to corresponding circular buffers. The digitized data from the plurality of frequency bands is then employed to re-construct the analog signal allowing for subsequent processing to generate the spectral content.

J. Earls et al in US Patent Application 2005/0,207,512 entitled "Multi-Channel Simultaneous Real-Time Spectrum Analysis with Offset Frequency Trigger" teaches a RTSA wherein a wideband IF signal derived from a wideband RF signal is provided to both a wideband IF channel and a narrowband IF channel simultaneously. The Wideband IF signal output from the Wideband IF channel is sampled at a high sample rate with relatively low resolution to produce wideband signal data. The wideband IF signal input to the narrowband IF channel is frequency offset by a variable amount according to a region in the wideband IF signal where a frequency trigger event is expected and then narrowband filtered to produce a narrowband IF signal. The narrowband IF signal is sampled at a relatively low sample rate with high resolution to produce high dynamic range signal data for input to a frequency trigger function.

Within the prior art Dong et al. in US Patent Application 2010/0,304,703 entitled "Multiple Frequency Band Hybrid Receiver" have described a receiver architecture primarily intended for communications signal processing. An example of its application is a dual-band Wi-Fi chip set operating at both 2.4 GHz and 5 GHz. In this architecture different frequency bands are input to a plurality of input terminals, in other words there is no overlap between the frequency ranges input to the different terminals. As well the lowest frequency band is associated with a direct-conversion process. All other frequency bands are down-converted to the input frequency of the mixer associated with the lowest frequency band. No pre-selector filter banks or switchable channel filters associated with the super-heterodyne stages.

Accordingly, the prior art of Bernard and Earls exploit conventional prior art super-heterodyne receivers without consideration of how that providing a true RTSA impacts the design and implementation of the RF front-end. In contrast LaMarche teaches to the use of banded super-heterodyne receivers to split a single RF input into 4 bands wherein the outputs of the multiple bands are digitized after processing to bring their RF power levels to approximately the optimum input power for the analog-to-digital convertors (ADCs). Likewise the prior art of Dong discussed above exploits prior art super-heterodyne receivers to always downconvert non-overlapping frequency bands to the lowest frequency band and accordingly frequency bands are always down-converted by a common final mixer and higher bands are down-converted multiple times to this lowest band.

In contrast, recent work by Cognio Inc., now part of Cisco Systems Inc., has considered signal analysis for determining whether to jam an unauthorized transmission occurring within a predetermined region, see for example N. R. Diener et al in U.S. Pat. No. 7,142,108 entitled "System and Method for Monitoring and Enforcing a Restricted Wireless Zone" (hereinafter referred to as Diener '108) and N. R. Diener et al in U.S. Pat. No. 7,184,777 entitled "Server and Multiple Sensor System for Monitoring Activity within a Shared Radio Frequency Band" (hereinafter referred to as Diener '777). Diener '108 teaches that at each location within the predetermined region a spectrum monitoring section analyses all activity within a narrow predetermined band, e.g. 2.400-2.483 GHz ISM, 5.725-5.825 GHz Upper U-NII (U-NII-3) band for example, based upon applying a Fast-Fourier Transform (FFT) to received pulsed signals with multiple FFT intervals to determine a power versus frequency plot. This data is then sent, using a different frequency range and transmission standard, to a central server for every cycle of the FFT process along with additional information derived from a co-hosted traffic monitoring station that operates using International standard protocols, such as IEEE 802.11, to generate probe requests and receive responses allowing legitimate traffic to be identified or transmitting nodes operating according to the International standard to be located.

Each of Diener '108 and Diener '777 utilize a spectrum analysis engine (SAGE) as described by G. L. Sugar et al in U.S. Pat. Nos. 6,714,605 and 7,224,752 entitled "System and Method for Real-Time Spectrum Analysis in a Communication Device"; Sugar et al in U.S. Pat. No. 7,254,191 entitled "System and Method for Real-Time Spectrum Analysis in a Radio Device"; and D. Kloper et al in U.S. Pat. No. 7,606,335 entitled "Signal Pulse Detection Scheme for Use in Real-Time Spectrum Analysis." The SAGE also providing spectral analysis for other aspects of management of wireless infrastructure taught by Cognio including U.S. Pat. Nos. 6,850,735; 7,269,151; 7,079,812; 7,116,943; 7,171,161; 6,941,110; 7,035,593; U.S. Pat. Nos. 7,110,756; and 7,292,656 as well as US Patent Application 2003/0,198,200; 2007/0,264,939; and 2008/0,019.464.

As presented by Sugar and Kloper the SAGE is presented as a hardware accelerator to determine information about pulses occurring within a predetermined frequency range, determined in dependence upon the wireless network that the SAGE is monitoring, and provides information to network infrastructure elements allowing network management activities to be performed, these being the subject of the other patents identified above in respect of Cognio although it would be noted that other prior exists in respect of managing networks based upon determined characteristics of activity within the network. The SAGE, as described in respect of FIG. 2 below, does not consider any aspect of the design of the RF front-end apart from an RF interface which adjusts the gain provided to the received RF signal such that the maximum signal received in the last T seconds (for example 1 second) is 6 dB below the full-scale of the analog-to-digital converter (ADC) within the RF interface.

The digitized RF signal from the RF interface, actually the digitized IF signal received, is windowed and processed with a Fast-Fourier Transform (FFT) to convert the digitized signal to the frequency domain. The FFT processed IF signal is then coupled to a plurality of peak detectors and pulse detectors which make decisions based upon predetermined characteristics of signals anticipated as present within the network, i.e. the pulse has a predetermined width. The decisions from the pulse detectors and peak detectors are then used through a series of rules to determine whether the SAGE will capture a portion of the received RF signal and/or forward the power measurements to memory. The SAGE only captures on a consistent basis statistical data from the FFT. Accordingly, signals outside the pulse detector configurations, which are for predetermined signal types, are not captured or analysed except to increment counters within the frequency bins associated with the FFT results.

Further, the SAGE via a Universal Signal Synchronizer establishes timing synchronization of the pulse detectors etc. to the network being monitored. Accordingly, signals occurring out of synchronization are not analysed correctly such as those for example arising from another transmitter operating according to the same standard but on different time base and a transmitter on a different timing for transmissions Likewise aperiodic frequency hopping signals would not be captured. This inherent timing and synchronization reflects the focus of the work of Cognio to narrowband (100 MHz) standard communications bands, such as those relating for example to IEEE 802.11b, IEEE 802.11g and IEEE 802.16e. As a result the SAGE does not actually perform real-time analysis of the RF spectrum in the wireless environment being monitored as decisions are based upon the determination that events conforming to predetermined criteria have occurred which are based upon determining pulse characteristics that may be for example 4.6 ms in GSM, 5 ms in WiMAX (IEEE 802.16) or variable in Wi-Fi (IEEE 802.11).

Today multiple networks are operating simultaneously within the environment of a user who may for example be working at their laptop with a Wi-Fi wireless router (e.g. 5.775 GHz U-NII-3 based IEEE 802.11) interfaced to the Internet whilst talking using a Bluetooth (unlicensed 2.4 GHz) headset to a Voice-over-IP (VOIP) with their Research in Motion™ Blackberry operating at 1.9 GHz on GSM. Accordingly, interference on one device may arise from sidelobes of signals transmitted in other bands from other devices. Accordingly, to determine such effects, monitor legitimate activity, identify rogue transmitters, networks etc. as discussed supra along with other enforcement/monitoring/proactive applications it would be beneficial to cost-effectively monitor geographical areas for signal activity within multiple frequency bands over a wide frequency range whilst providing the ability to do so truly in real-time such that even very short intermittent transmitters are identified in applications that are sensitive to such signals from security, control, or prevention issues for example.

However, as with most RF and high speed electronics this desired increase in instantaneous bandwidth (IBW), real-time processing and operating frequency range (for example 0-8 GHz) produces a dilemma because the operating frequency range of the RTSA is primarily related to RF amplifier design, filter design and semiconductor technologies whilst the processing speed and IBW are determined through a combination of the RF front-end, ADCs, FFT processing, etc. and hence are impacted by both analog and digital portions of the RTSA. The RTSA-like laboratory and held-held spectrum analysers would traditionally be designed using custom application specific integrated circuits (ASICs) for the analog portions and high speed field programmable gate arrays (FPGAs) for the digital portion. These ASICs and FPGAs typically being built utilizing the higher performance integrated circuit (IC) design processes and manufacturing available. In other words, the RTSA is essentially built in and uses different processes and designs to the transceiver circuits that broadcast the RF signals that the RTSA is designed to monitor. This is very different from spectrum and protocol analysers addressing specific telecommunications standards that can typically leverage the same ASICs and other circuit elements of devices operating according to those standards, such as cellphones, smartphones, PDAs, etc.

High speed FPGAs and custom ASICs are expensive and in some instances difficult to utilize. In high volume consumer applications such as Wi-Fi (IEEE 802.11), WiMAX (IEEE 802.16) and Bluetooth the transmitter circuits and receiver circuits are typically implemented with silicon based digital IC designs and processes whereas the RTSA is optimized towards to both digital and analog aspects for high performance measurement applications wherein it is beneficial to leverage new IC design processes optimized to aspects such as faster computational processing, improved serial data links, etc. as well as RF circuit integration rather than accepting performance tradeoffs, whilst meeting a wireless specification, in order to provide monolithic integration and exploit lower cost IC processes.

It has been determined by the inventors of the present invention that a hybrid receiver architecture can be combined with digital based back end processing to satisfy the conflicting requirements of low-cost, high speed, wide IBW, large operating frequency range, and high sensitivity so that they can be balanced within a field-deployable network interfaced module wherein deployed volumes whilst significantly larger than laboratory based test equipment will not reach by orders of magnitude the volumes of the RF transmitters they are monitoring. This is not to say that such receivers won't find utility in other signal analyzer applications.

Accordingly, based upon embodiments of the invention, the inventors have established a low cost, broadband, real-time signal analyzer circuit that allows for the deployment of such RTSA devices in a distributed environment wherein determination of policy breaches, network performance, regulatory compliance, etc. are locally determined and exploited directly in network management or communicated to the central server and network administrators for subsequent action. Beneficially the RTSA according to embodiments of the invention provides for a scalable architecture wherein multiple RTSA modules may be synchronized providing enhanced spectral bandwidth, processing speed, and monitoring.

However, it would be apparent that such a hybrid receiver providing low-cost, high speed, wide IBW, large operating frequency range, and high sensitivity would have a wide range of applications including, but not limited to, spectrum analysers, protocol receivers, frequency agile receivers and transponders, network management, and EMC testing. It would further be evident that the deployment context of devices employing such hybrid receivers may include, but not be limited to, laboratory environments, remote stand-alone deployments, integration or deployment with other network infrastructure, hand-held or field-test deployments, as well as part of other civilian, Governmental and military systems and platforms.

SUMMARY OF THE INVENTION

It is an object of the present invention to obviate or mitigate at least one disadvantage of the prior art.

In accordance with an embodiment of the invention there is provided a method comprising providing a plurality of input terminals, each input terminal receiving RF signals within a first predetermined portion of a predetermined frequency range, and providing a plurality of RF processing circuits connected to the plurality of input terminals, each RF processing circuit performing a predetermined processing function on a second predetermined portion of the predetermined frequency range, wherein each of the plurality of second predetermined portions of the predetermined frequency range comprise a first predetermined sub-set of frequencies that are the same as a second predetermined sub-set of frequencies within another one of the plurality of second predetermined frequency ranges.

In accordance with an embodiment of the invention there is provided a device comprising a plurality of input terminals, each input terminal receiving RF signals within a first predetermined portion of a predetermined frequency range, and a plurality of RF processing circuits connected to the plurality of input terminals, each RF processing circuit performing a predetermined processing function on a second predetermined portion of the predetermined frequency range, wherein each of the plurality of second predetermined portions of the predetermined frequency range comprise a first predetermined sub-set of frequencies that are the same as a second predetermined sub-set of frequencies within another one of the plurality of second predetermined frequency ranges.

In accordance with an embodiment of the invention there is provided a device comprising a first RF circuit for receiving a RF signal within a first predetermined frequency range and processing the received RF signal, and a digital down converter for receiving the processed RF signal from the first RF signal and decimating the received processed RF signal to extract a predetermined channel from the received processed RF signal.

In accordance with an embodiment of the invention there is provided a method comprising providing a first RF circuit for receiving a RF signal within a first predetermined frequency range and processing the received RF signal, and providing a digital down converter circuit for receiving the processed RF signal from the first RF signal and decimating the received processed RF signal to extract a predetermined channel from the received processed RF signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 20 depicts a digital down conversion circuit according to an embodiment of the invention;

FIG. 21 depicts a cascaded integrator comb circuit forming part of a direct down conversion circuit according to an embodiment of the invention;

DETAILED DESCRIPTION

The present invention is directed to RF receivers and more specifically to broadband receivers for real-time signal analysis.

Figure 1A:
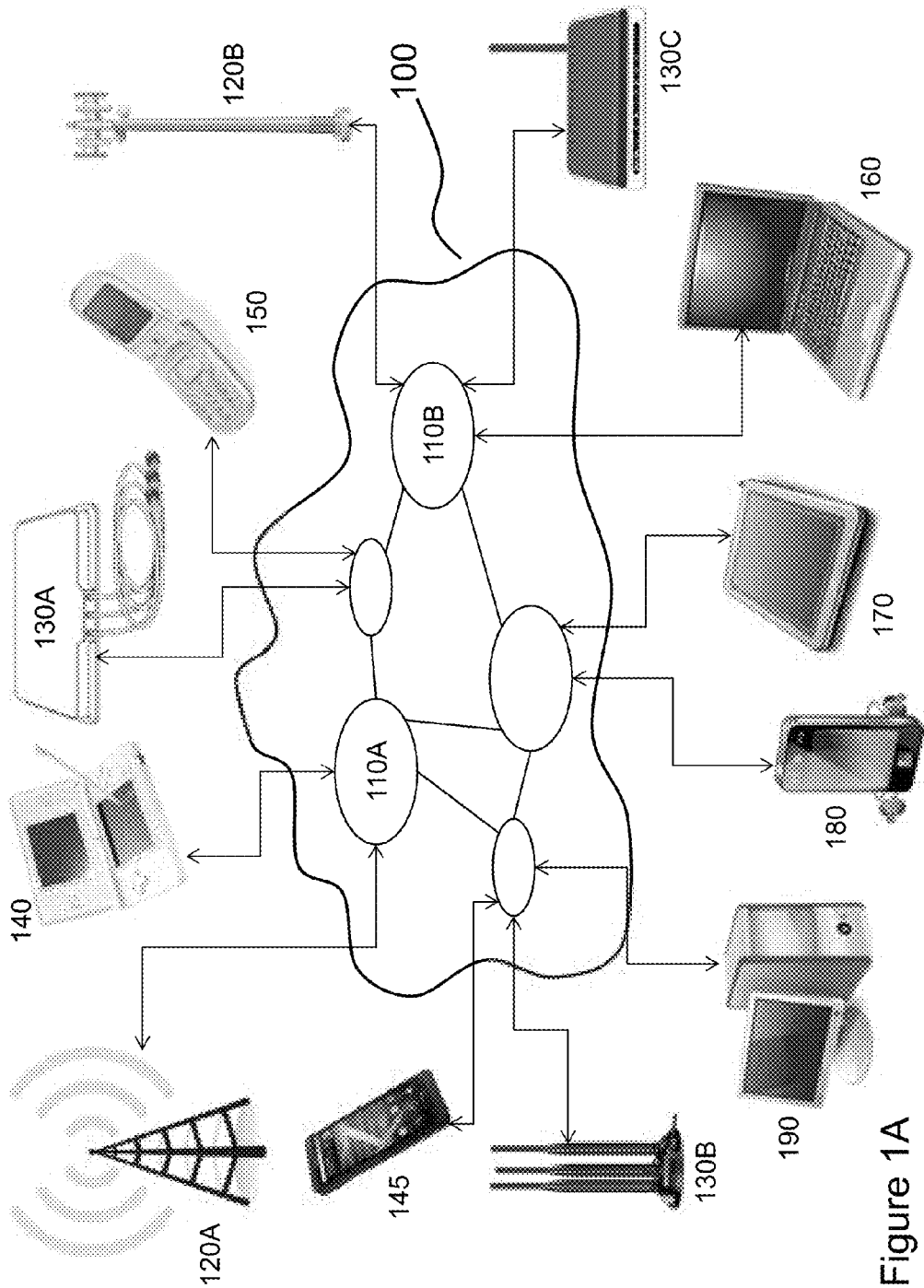
FIG. 1A depicts a network accessed by wireless devices.

FIG. 1A depicts a network 100 accessed by a plurality of wireless devices. The network 100 may be formed from a plurality of sub-networks, of which first and second sub-networks 110A and 110B are identified. First sub-network 110A may for example be a transport network associated with a service provider wherein the primary communications are provided through a first telecommunications standard, such as GSM for example, relating to cellular networks. Second sub-network 110B may for example be associated with Internet Protocol (IP) traffic according to a second telecommunications standard, e.g. Internet Protocol v6. Network 100 may therefore be formed from a combination of wired and wireless infrastructure that provides a wireless interface for wireless devices according to one or more standards. For example, first sub-network 110A being GSM based incorporates cellular base stations such as tower 120A and 120B, whilst second sub-network 110B being Internet based incorporates access points such as wall mounted MIMO antenna 130A, free standing MIMO antenna 130B, and Internet router 130C. Accessing the network 100 through this infrastructure as well as other methods not presented are wireless devices including for example, but not limited to, portable gaming console 140, smartphone 145, cellular phone 150, laptop computer 160, tablet PC 170, portable multimedia player 180 and desktop PC 190.

Accordingly, network 100 may operate according to one or more telecommunication standards including but not limited to IEEE 802.11 (WLAN, Wi-Fi), IEEE 802.15 (PAN), IEEE 802.16 (WiMAX), IEEE 802.20 (MBWA), Universal Mobile Telecommunications System (UMTS), Global System for Mobile Communications (GSM) 850, GSM 900, GSM 1800, GSM 1900, General Packet Radio Service (GPRS), Industrial, Scientific and Medical (ISM) bands regulated by ITU-R 5.138, ITU-R 5.150, ITU-R 5.280, and IMT-2000 (International Mobile Telecommunications-2000). Some standards include multiple internal standards such as IEEE 802.11 which includes IEEE 802.11A, IEEE 802.11B, IEEE 802.11G, and IEEE 802.11N. As such a wireless device may receive signals according to multiple wireless standards.

Figure 1B:
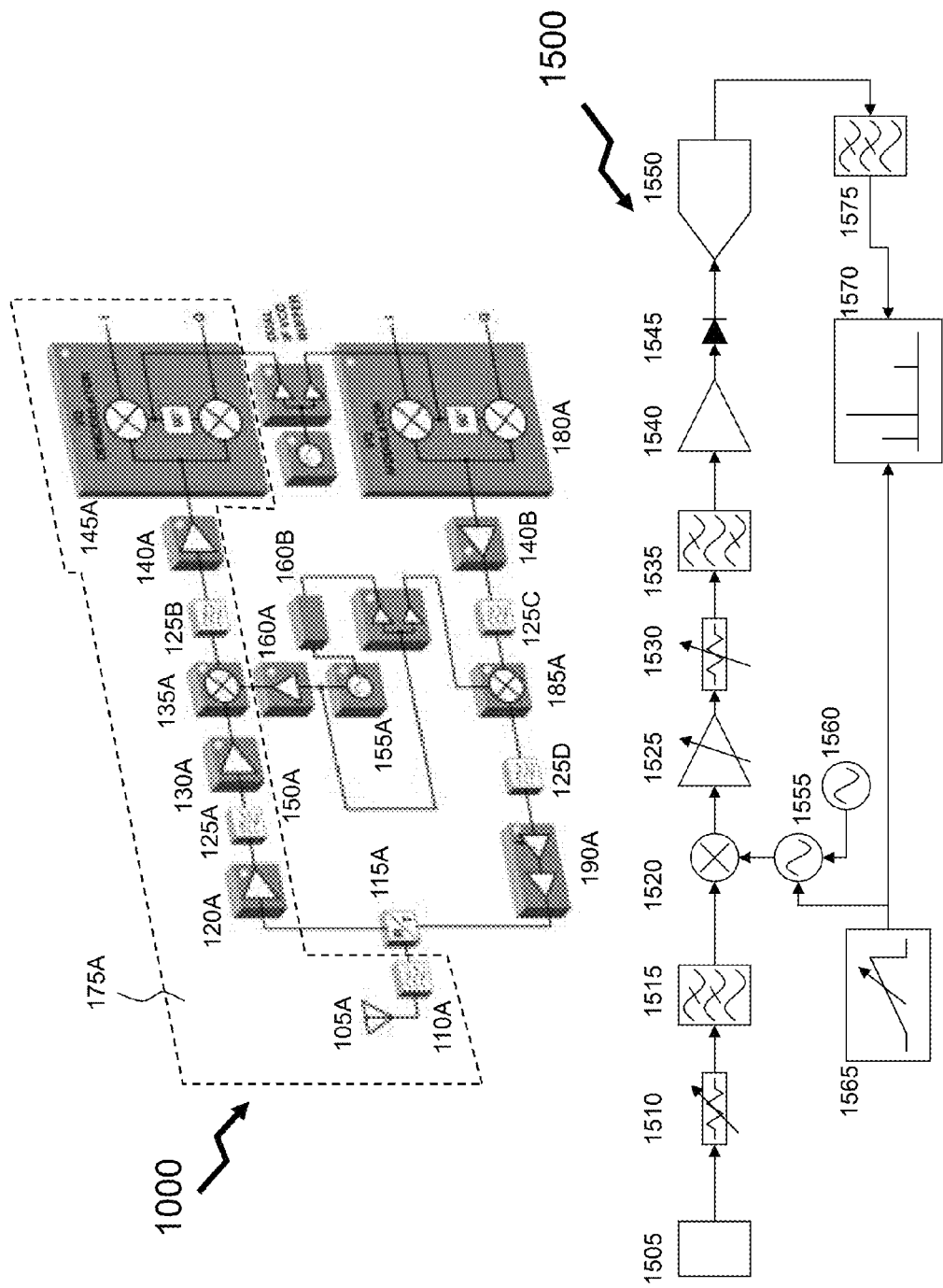
FIG. 1B depicts a transceiver within a wireless device accessing a wireless network and a classic super-heterodyne receiver according to the prior art.

Now referring to FIG. 1B there is depicted a typical transceiver 1000 according to the prior art within a wireless device accessing a wireless network such as network 100 above. The transceiver 1000 comprises an antenna 105A wherein RF signals to/from the antenna 105A to receive—transmit switch 115A are filtered by filter 110A. Considering the receiver side of the transceiver the received RF signal is coupled from the receive—transmit switch 115A to a low noise amplifier (LNA) 120A, then through receive filter 125A, and first wideband gain block (WGB) 130A to downconverter 135A wherein the received RF signal is down converted using a local signal generated by the local oscillator 155A which is buffered prior to the downconverter 135A by buffer 150A. After down conversion to an intermediate frequency (IF) the received signal is coupled from the downconverter 135A to second filter 125B and second WGB 140A before being demodulated in I/Q demodulator 145A wherein in-phase (I) and quadrature (Q) signals are generated by a second mixing stage.

On the transmit side the signal to be transmitted is coupled as I and Q signals to an I/Q modulator 180A wherein the combined signal is then coupled via third WGB 140B to third filter 125C before being up-converted by up-converter 185A. The up-converted RF signal is then coupled via transmit filter 125D to a power amplifier 190A and then coupled to the antenna 105A via receive—transmit switch 115A and filter 110. Accordingly the operation of the transceiver 1000 is driven by a clock synchronized to the network such that the device transmits within one timeslot and receives within another timeslot. Whilst the receive path of the transceiver 1000 comprises filter 110A and receive filter 125A any RF signals within the bandwidth of these filters is coupled through the RF chain and impacts the performance of the link between this transceiver 1000 and another device.

The in-band interfering signals may come from in-band transmissions of other devices operating according to the same standard as transceiver 1000, regulated devices operating in adjacent frequency bands where transmit frequency sidelobes coincide with the passband of filter 110A and receive filter 125, and unregulated devices in the same band or another passband. The local oscillator 155A coupled to the downconverter 135A via gain stage 160A and up-converter 185A operates in a phased lock loop with PLL 160B.

Also depicted in FIG. 1B is classic super-heterodyne receiver 1500 according to the prior art. Accordingly an input signal, received from a source 1505 passes through an attenuator 1510 and a low-pass filter 1515 to a mixer 1520. In mixer 1520 this filtered, attenuated signal is mixed with a signal from a local oscillator (LO) 1555. Because the mixer is a non-linear device, its output includes not only the two original signals, but also their harmonics and the sums and differences of the original frequencies and their harmonics. If any of the mixed signals fall within the passband of the intermediate-frequency (IF') filter 1535 after passing through variable gain stage 1525 and another variable attenuator 1530 it is further processed, for example amplified again with amplifier 1540, and input to an envelope detector 1545, digitized via ADC 1550 and displayed on display 1570. The digitized signals may be further filtered with digital filter 1575. A ramp generator 1565 generates a control signal that creates the horizontal movement across the display 1570 from left to right. This ramp signal also tunes the LO 1555 so that its frequency change is in proportion to the ramp signal, where the LO 1555 is driven from a reference oscillator 1560.

Figure 2:
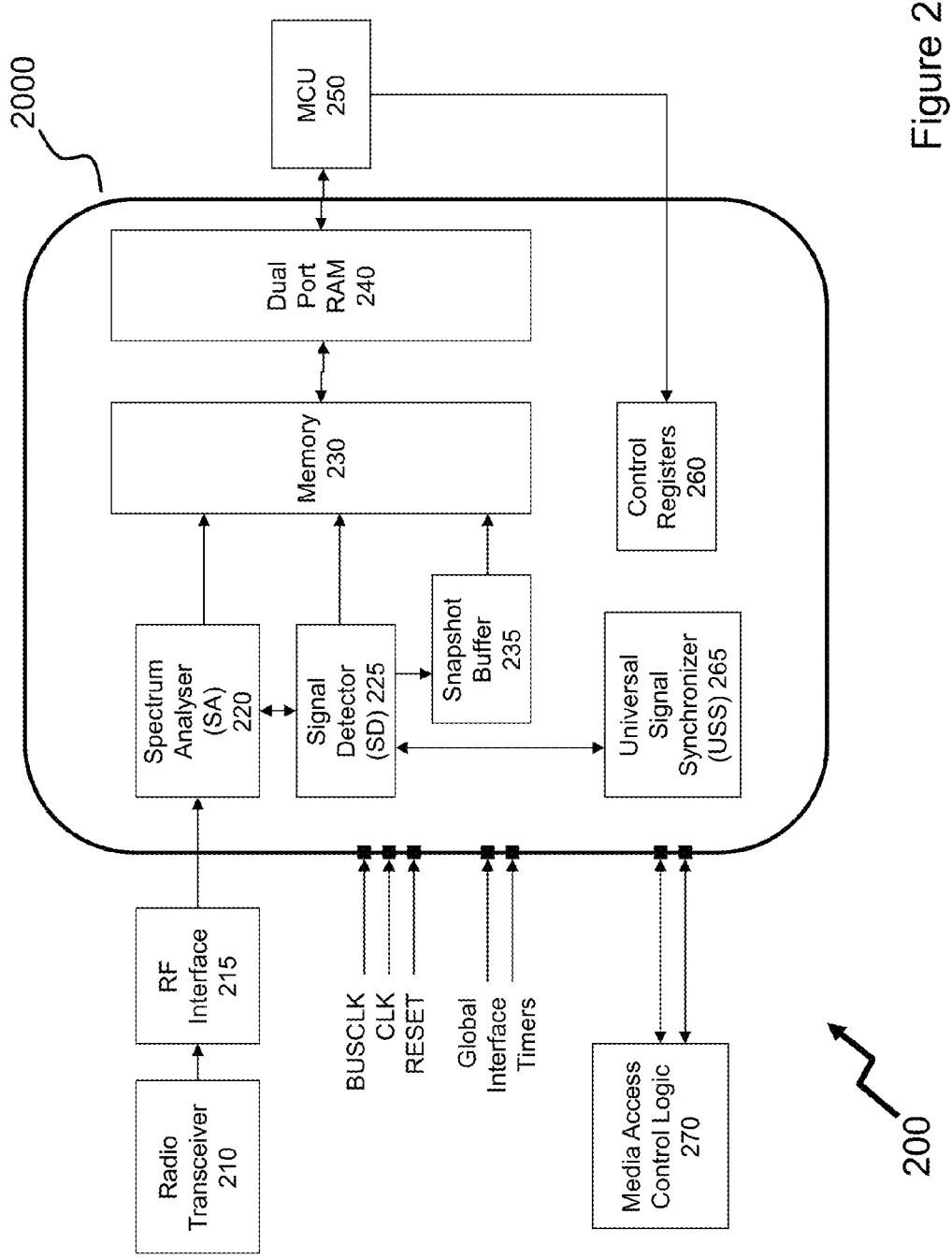
FIG. 2 depicts a spectrum analyzer according to the prior art of U.S. Pat. No. 6,714,605.

Referring to FIG. 2 there is depicted a spectrum analyzer according to the prior art of Sugar et al in U.S. Pat. No. 6,714,605 entitled "System and Method for Real-Time Spectrum Analysis in a Communication Device." Accordingly Sugar teaches to spectrum analyzer (SA) 2000 coupled to a radio transceiver 210 and RF interface 215. The radio transceiver 210 is taught as processing received RF signals and converting them to baseband signals. As such radio transceiver 210 comprises essentially the elements shown within receive block 175A of FIG. 1B.

The RF interface as taught comprises an analog-to-digital converter (ADC) block, an automatic gain control (AGC) block, a direct current (DC) correction block and an amplitude/phase correction block. Sugar teaching that for a RF receiver in which the local oscillator (LO) for the quadrature down-converter 135A is placed at the center of the band of interest that the DC, amplitude and phase offset compensation of the I and Q signals is provided before the Fast Fourier Transform (FFT) to maximize LO and sideband suppression. The resulting baseband signals are sampled at the CLK frequency using two ADCs. The AGC block dynamically adjusts the gain of the receiver to optimize the placement of the signals being converted within the dynamic range of the ADC. DC correction is performed adaptively by estimating the DC offset at the ADC output and updating a correction DAC to remove large DC offsets. Any residual DC offset after course correction is removed after the ADC via digital subtraction.

The resultant digitized output from the RF interface 215 is then coupled to spectrum analyzer (SA) 220 wherein the signal is processed through a Fast-Fourier Transform (FFT), the output of which is coupled to memory 230 and signal detector (SD) 225. The data coupled to the memory 230 from the SA 220 being the results from the FFT that are used to update statistics on the wireless environment. The data coupled to the SD 225 is used by a plurality of signal detector circuits to determine the presence of pulses meeting predetermined conditions by tracking the rising edge and falling edge of a signal within one of the FFT result bins. Similarly peak detectors within the SD 225 capture the peak power of any pulse detected. Based upon the results of the plurality of signal detectors and peak detectors within the SD 225 information may be forwarded to a snapshot buffer (SB) 235 wherein a portion of the received FFT data is transferred to the memory 230.

Data from the signal detectors within the SD 225 is also coupled to a universal signal synchronizer (USS) 265 that seeks to establish timing information from the plurality of detected pulses according to a predetermined standard wherein the resulting determination from the USS 265 is used to synchronize the clock within the SA 2000 to the detected pulses and thereby synchronise the SA 2000 to the network. Data from the memory 230 is transferred to a dual port RAM for transmission to a microprocessor control unit (MCU) 250, again under clock control of the SA 2000 such that updated statistical data etc. is transmitted after every FFT sequence irrespective of the contents of the FFT. If the MCU 250 was remote from the SA 2000 rather than co-located in the Cognio applications disclosed supra in the listed patents and patent applications this would place a significant overhead on the communications medium between the SA 2000 and MCU 250.

The USS 265 also interfaces to a medium access control (MAC) circuit 270 that manages the scheduling of the packet transmissions in the frequency band according to a MAC protocol, such as, for example IEEE 802.11 protocols. Additionally MAC 270 and MCU 250 may exchange information via the SA 2000 so that the MAC 270 may perform analysis relating to traffic statistics whilst MCU 250 may perform background analysis to identify another device operating within the frequency band.

Figure 3:
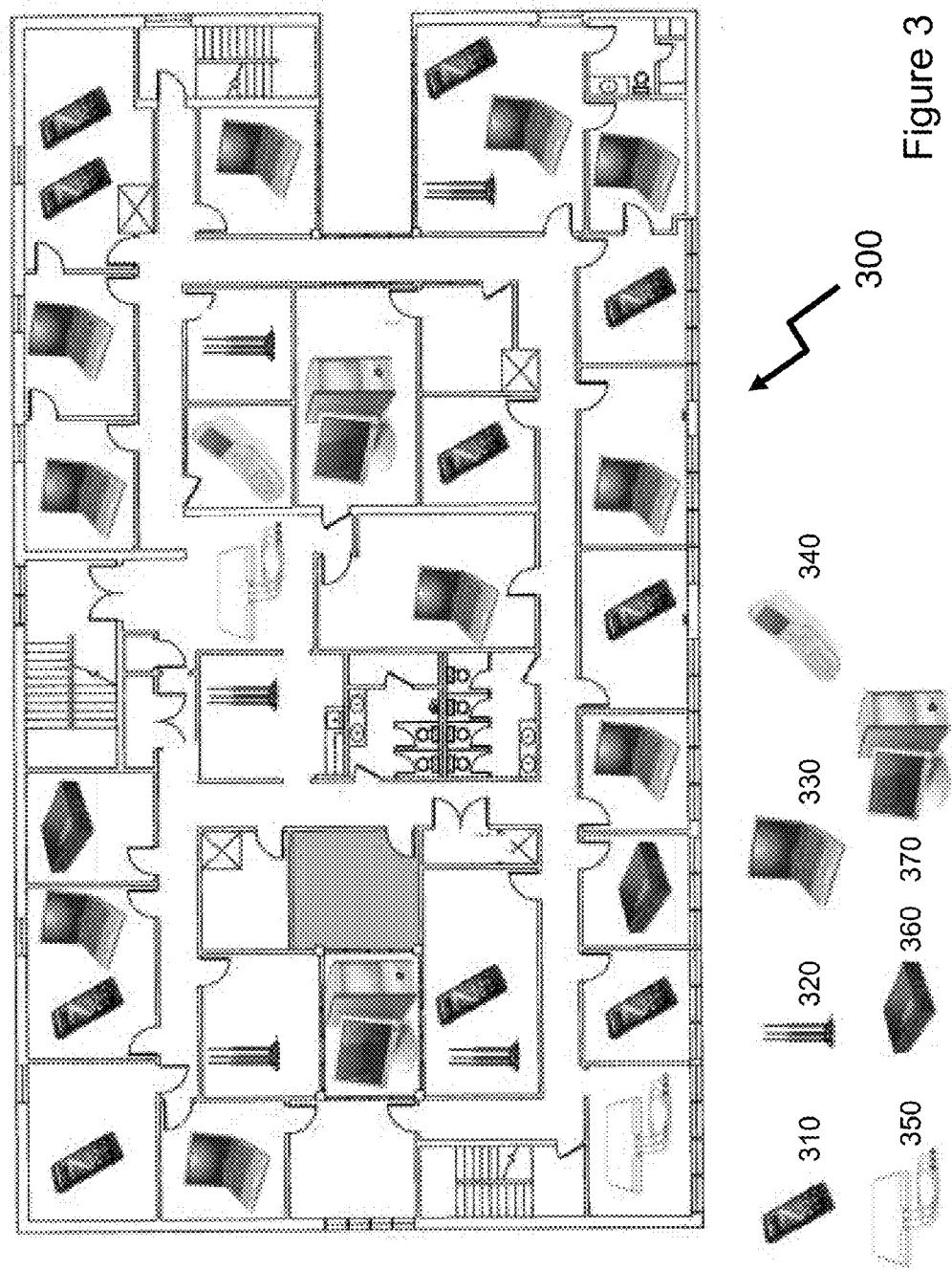
FIG. 3 depicts an example of a wireless environment with distributed network monitoring.

Now referring to FIG. 3 there is depicted an example of a wireless environment 300 with distributed network monitoring. Accordingly within the wireless environment 300 there are multiple wireless devices, for example smartphones 310, laptop computers 330, cellphones 340 and desktop PCs 370 that are operating upon multiple networks. For example, smartphones 310 and cellphones 340 are accessing the local cellular network operating according to a GSM standard based upon the geographic location of the wireless environment through cellular towers (not shown for clarity), laptop computers 330 and desktop PCs 370 are accessing Wi-Fi and WiMAX networks through Wi-Fi routers 320 and WiMAX antennas 350 that are distributed within the building forming the physical structure of the wireless environment 300. Additionally, some laptop computers 330 may be accessing both Wi-Fi routers 320 and WiMAX antennas 350 by virtue of having dual transceivers installed within them. Similarly some smartphones 310 may be accessing Wi-Fi routers 320 by virtue of being Wi-Fi enabled, examples today including Apple iPhone 3G, Blackberry Curve 8900, HTC Ozone, and Nokia N97.

A subset of these devices may also be using Bluetooth or equivalent to provide users with hands free headphones, wireless memory access, etc. The result of which being that within the small wireless environment there are devices operating according to IEEE 802.11, IEEE 802.16, IEEE 802.15 and GSM. Further, as GSM devices may be globally roaming a GSM device may in incorrectly set when initially turned on in such a wireless environment 300. For example, a cellphone accessing a network in the United Kingdom at 1800 MHz through the standard GSM 900/1800 networks may be now turned on in an area of Canada supporting 3G at 1700 MHz alongside GSM 850/1900 but where the 1800 MHz spectrum has been reserved by Industry Canada to the integrity of the electrical grid infrastructure through improved monitoring and control.

Deployed within the wireless environment 300 are RTSA devices 360 that provide for example real time monitoring over a 0-8 GHz spectrum allowing coverage of not only GSM 850/1900 but also the IEEE 802.11, IEEE 802.16, and IEEE 802.15 bands. Accordingly the standard operation of the devices within the wireless environment 300 is monitored as well as the unauthorized operation of a cellphone at 1800 MHz It would be evident that the RTSA devices 360 may be associated with different entities including for example the building supporting the physical infrastructure of the wireless environment 300, an owner or tenant of that particular physical infrastructure, and a provider of a network(s) supporting one or more standards as identified. It would also be evident that according to the physical and wireless environment that the density of RTSA devices 360 and their operating frequency ranges may be adjusted according to predetermined rules or adjusted according to a variety of factors including but not limited to traffic patterns, device density, and occurrences of interrupted/disrupted service.

Figure 4:
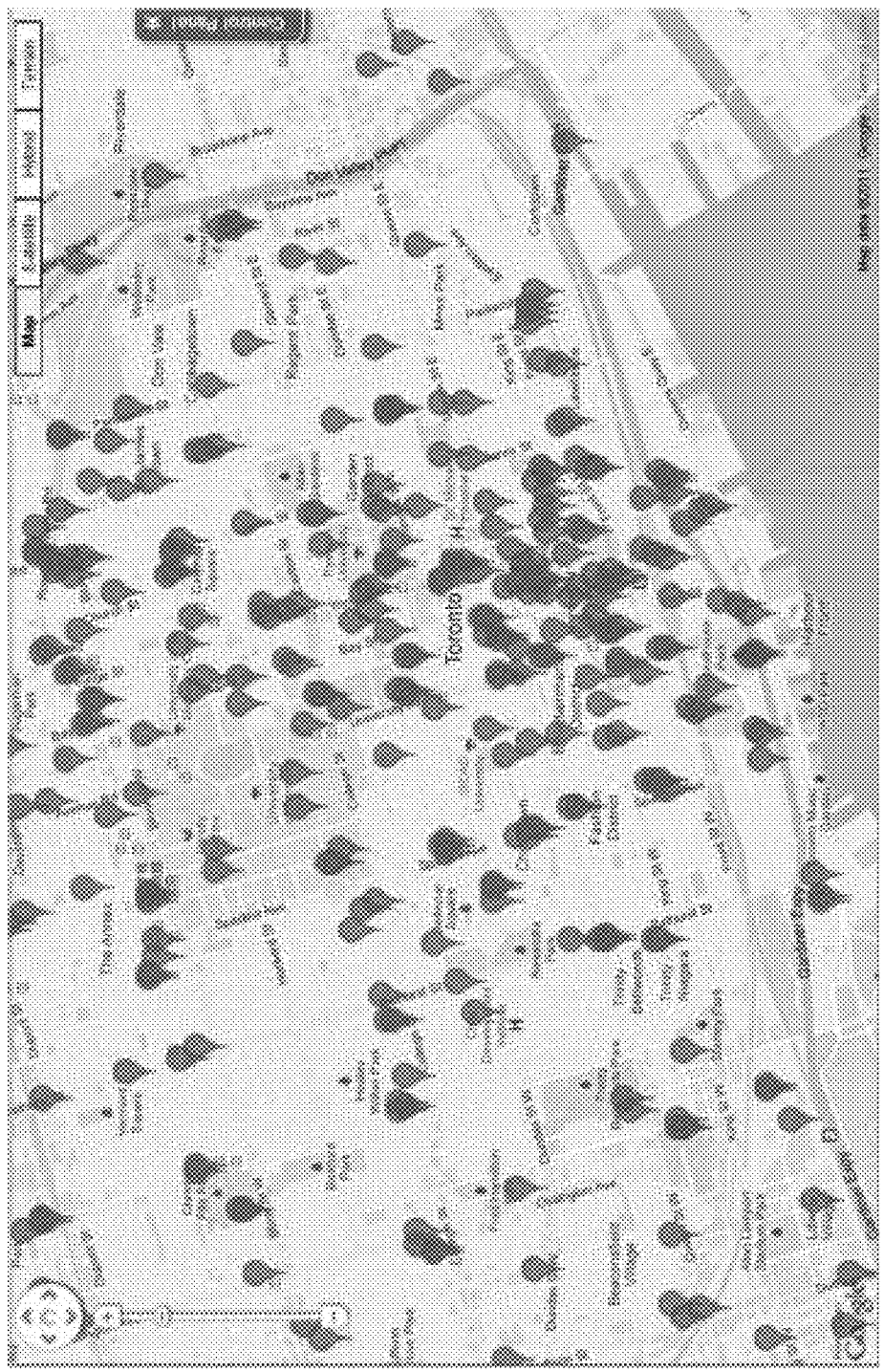
FIG. 4 depicts a geographical map of a part of downtown Toronto identifying antennas operated by service providers.
Figure 5:
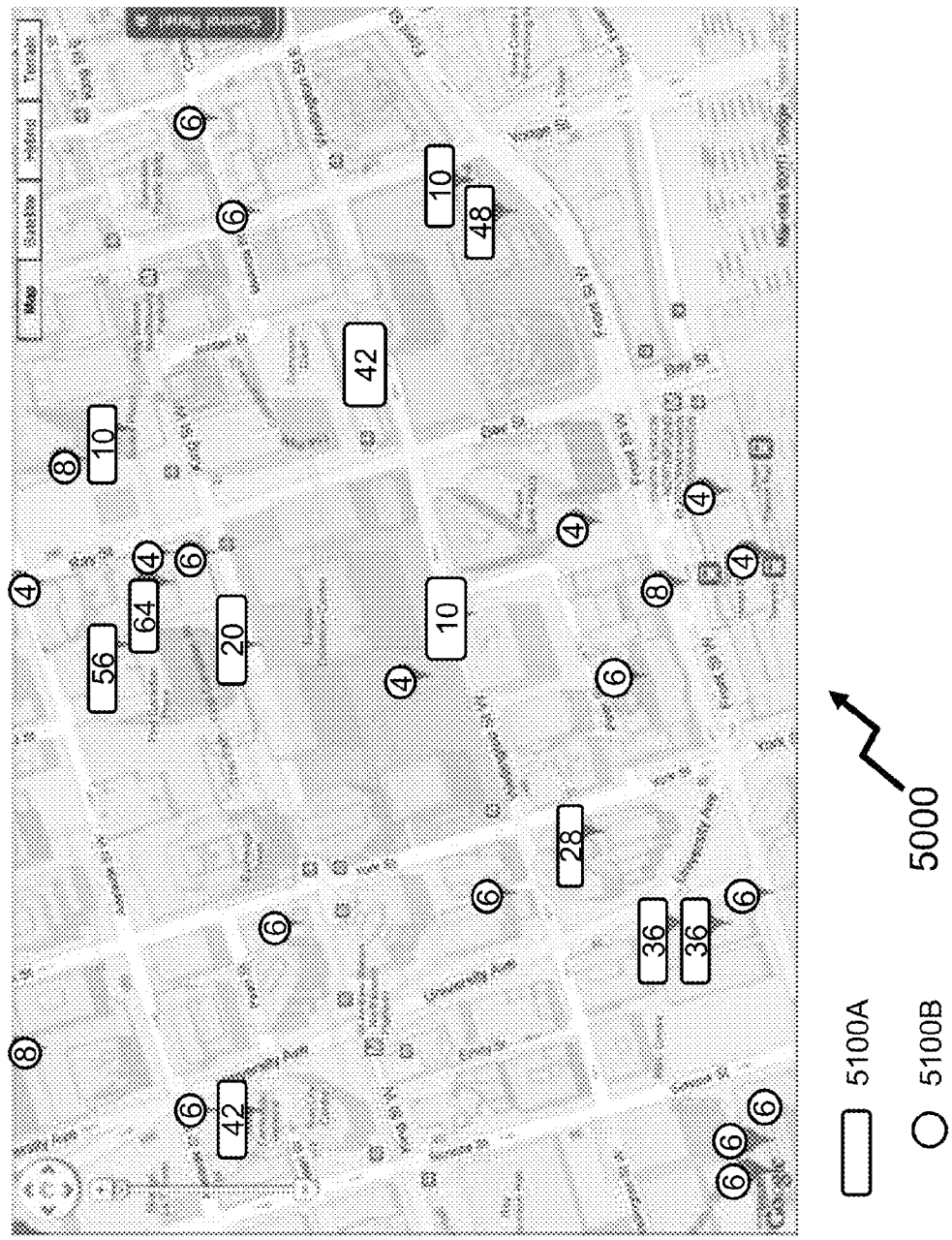
FIG. 5 depicts a street level map of the central business district in Toronto identifying antenna operated by service providers.

For example referring to FIG. 4 there is depicted a geographical map 400 of a part of downtown Toronto identifying antennas operated by GSM service providers. The approximately 3 km by 2 km downtown region comprises approximately 200 GSM cell towers 410 representing approximately 2,000 antenna elements. The number of antenna associated with each cell tower 410 varying from a lower limit of 4 through to an upper limit of 48. Referring to FIG. 5 this region is focused further with a street level map 500 of the central business district in Toronto identifying antenna operated by GSM service providers wherein the number of antenna elements at each GSM tower is denoted by those with 10 or more antenna with rectangles 4100A and those with less than 10 with circles 4100B. The GSM service providers include Rogers, Bell, Telus, Wind, and Videotron.

In the block 5000 defined by King St W, Wellington St W, York St and Bay St there is the Toronto Dominion Centre anchored by the headquarters of one of the top 5 banks in Canada representing over 90% of assets. Within or at the edge of the block are three cell towers, two rectangles 5100A and two circles 5100B representing 40 GSM antenna elements. However, the block contains 6 skyscrapers representing over 200 floors of businesses and accordingly many thousands of cellular telephones, smartphones, multimedia players, laptop computers etc. interfacing to wireless networks within these skyscrapers operating on a plurality of networks according to multiple standards with significant potential for interference as well as rogue transmitters, etc. resulting in degraded communications, loss of critical data or communications, espionage, fraud, etc.

Figure 6A:
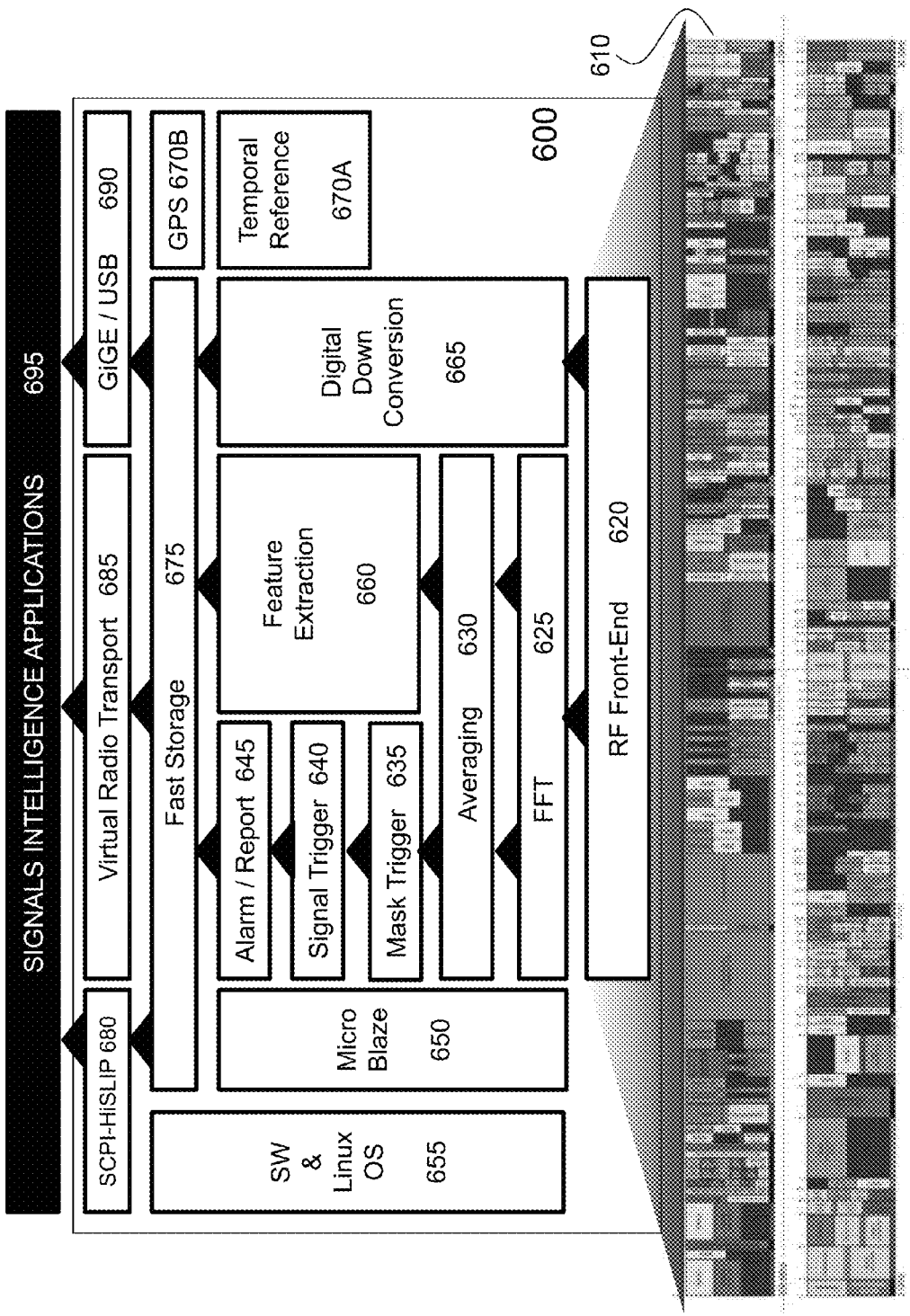
FIG. 6 depicts a real time spectrum analyzer according to an embodiment of the invention.

Now referring to FIG. 6A there is depicted a real time spectrum analyzer (RTSA) 600 according to an embodiment of the invention. Spectrum 610 depicts the regulated wireless environment between 300 MHz and 3 GHz (upper) and 3 GHz to 30 GHz (lower) (US Department of Commerce, National Telecommunications and Information Administration). This RF spectrum is received by an RF front end 620 wherein it is processed to generate in-phase (I) and quadrature (Q) baseband signals and converted to digital format. For example the RF front end 620 may operate from 0.1 MHz to 8 GHz with a resolution bandwidth of 10 kHz providing performance, sensitivity and spurious free dynamic range comparable to high end laboratory spectrum analyzers. The digitization of the downconverted RF signals provided to the FFT 625 and Digital Down Conversion (DDC) 665 being at 125 MSPS with 12-bit accuracy. The digitized baseband signals are coupled to both the FFT 625 and DDC 665 so as to allow real-time execution of both a Fast Fourier Transform (FFT) with a hardware based real-time FFT for extraction of frequency domain information and the real-time down conversion and decimation of the signal to extract channel data and/or characteristics.

The RF front end 620 provides for example a 100 MHz wide instantaneous bandwidth allowing the RTSA 600 to monitor entire communication bands at once whilst the center frequency of instantaneous bandwidth may be moved to scan the spectrum at a rate of more than 200 GHz per second such that the 8 GHz bandwidth of the RF front-end 620 may be scanned every 40 ms. This rate allowing for both the settling time at each frequency step and a dwell time that allows for more than 25,000 samples to be taken at each step. The scanning of the RTSA 600 being controlled through a user defined automatic scan list that allows each RTSA to be configured to scan a list of up to 1024 center frequencies thereby enabling scans of the entire spectrum, or specific frequencies, or where ever and how ever the user wants. Further for each center frequency, the user may also define other RTSA 600 settings including but not limited to antenna selection (where multiple antennas are available), gain election for the RF front end 620, dwell time, averaging, DDC and channelization parameters, mask trigger, signal triggers, and alarm conditions.

The down-converted and decimated signal, channelized signal, from the DDC 665 block is then coupled to a high speed memory 675 for storage wherein it may be subsequently discarded, processed further, or transmitted from the RTSA 600 to a remote management server for analysis. The output of the FFT 625 is forwarded to an averaging circuit 630 wherein the data is then forwarded to two paths of processing. The first path being a sophisticated and efficient signal triggering mechanism for capturing and discerning signals-of-interest (SOIs) in real-time through mask trigger 635, signal trigger 640, and alarm/report 645 circuits wherein the alarms and reports are stored within the high speed memory 675.

The signal triggers, feature extraction and alarm functions are all implemented relative to the mask triggers. Within RTSA 600 there is a unique user-definable mask trigger for each of 1024 user-defined center frequencies within the scan list, although optionally multiple mask triggers could be associated with each centre frequency. Further for each of the 1024 user-defined center frequencies within the scan list there are eight signal triggers per center frequency, providing more than 8000 user-definable triggers across the spectrum. As with the mask trigger the number of signal triggers may be varied. Each signal trigger performs an energy detection relative to the mask trigger allowing each individual signal trigger to define an expected signal frequency and bandwidth such that precise thresholds pertaining to signal rise, fall, bandwidth and power can be established thereby eliminating false negative triggers due to noise.

The second path from the averaging 640 is feature extraction 640 wherein features are extracted on signals that exceed a mask trigger. For example feature extraction 640 may note frequency, bandwidth, peak amplitude and the RMS power of the signal. Further, in order to avoid false signal detections due to noise, the feature extraction 640 only recognizes a signal if the signal exceeds a user-defined threshold of RMS power. If the transitions of a capture signal correlate with the any of the user-defined signal triggers then an association with that signal trigger is noted. If there is no correlation to any signal trigger then an "unknown" signal trigger is noted. The unknown signal trigger is for the purpose capturing and discerning anomalies.

The alarm/report 645 provides a memory and network efficient means of acting and reporting upon SOIs as they raised upon the capture of signals whether those signals are associated with signal triggers or are unknown. The alarms provide the ability to record different attributes of SOIs to memory, for example high speed memory 675, that may include the associated IQ data and/or request user-defined actions by the embedded software such as subsequent post-processing or transfer of data to a remote network server.

RTSA 600 receives control data and provides data with multiple protocols allowing flexibility in communications for remote deployments as well as those associated with network infrastructure for example. As depicted these are Standard Commands for Programmable Instruments (SCPI) is an ASCII textual standard command set for controlling instrumentation wherein High-Speed LAN Instrument Protocol (HiSLIP) is one version allowing communications over TCP/IP. Also supported is VITA 49 Radio Transport (VRT) protocol for high speed as we as Gigabit Ethernet (GiGE) and Universal Serial Bus (USB). The being provided by SCPI-HiSLIP 680, VRT 685 and GiGE/USB 690 communications blocks.

The RTSA 600 also supports transmitter geo-location by providing for example clock synchronization; time synchronization of networked RTSAs integrated GPS (GPS 670B), VRT time synchronization; accurate time-stamping (temporal reference 670A); and accurate received signal strength indicator (RSSI). Further as depicted RTSA 600 incorporates a Micro Blaze 650, which is a soft processor core implemented entirely in the general-purpose memory and logic fabric of FPGAs, and operates using software and Linux operating system hosted in SW & Linux OS 655. The RTSA 600 through the interfaces provides data to external applications such as Signals Intelligence Applications 695 which may include signal post-processing, demodulation and geo-location on the server-side through proprietary and/or third-party applications such as MATLAB, GNU Radio and Air-Patrol's Wireless Intelligence.

Within the embodiments of the invention described in FIG. 6A through the elements of any embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc. that is implemented or embodied in a hardware structure (e.g., flash memory, ROM, EROM). Examples of firmware may include microcode, writable control store, micro-programmed structure.

When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information.

Examples of the processor readable or machine accessible medium include but are not limited to an electronic circuit, a semiconductor memory device, a read only memory (ROM), a flash memory, an erasable ROM (EROM), a floppy diskette, a compact disk (CD) ROM, an optical disk, and a hard disk. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

Any hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

When an embodiment of the invention may be described as a process it is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

When the methodologies described herein are, in one or more embodiments, performable by a machine such a machine may include one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The term memory as used herein refers to any non-transitory tangible computer storage medium. The memory includes machine-readable code segments (e.g. software) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The term "machine" may also be taken to include any collection of machines that individually or jointly execute a set (or multiple sets) of instructions to perform any one or more of the methodologies discussed herein.

When an embodiment of the invention may be described in terms of an electronic circuit, such electronic circuit generally refers to an element having a physical structure such as a semiconductor device, an integrated circuit, a hybrid circuit, an analog circuit, a digital circuit, and a mixed signal circuit but it may refer to a replacement of a physical circuit with processing performed using digital signal processing controlled through one or more microprocessors. Such electronic circuit may be implemented in one or more semiconductor technologies, including for example silicon, germanium, silicon germanium, indium phosphide and gallium arsenide.

Figure 6B:
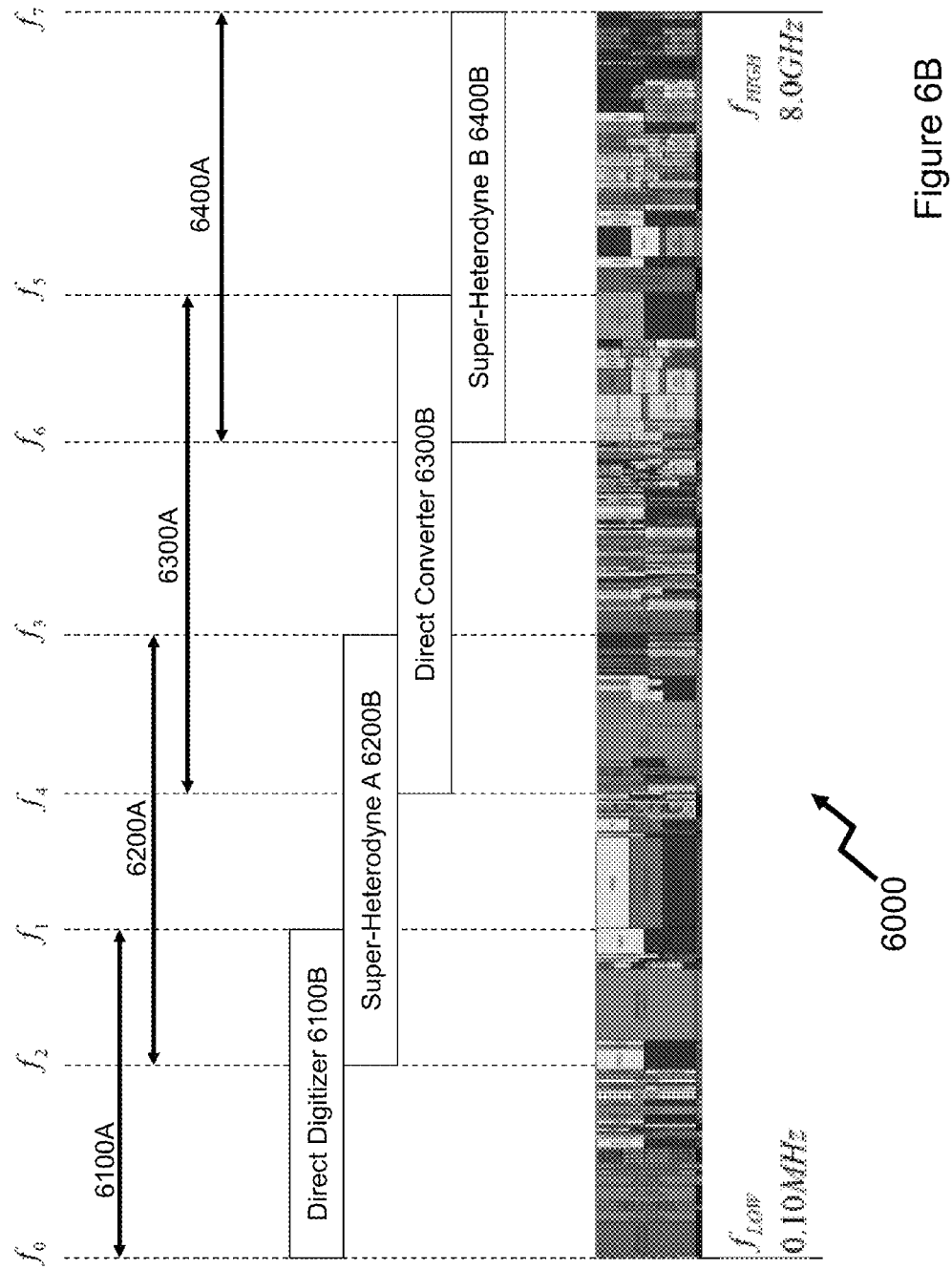

Referring to FIG. 6B, it is required to process signals from a lower frequency limit $f_{LOW}$=0.10 MHz to an upper frequency limit $f_{HIGH}$=8.0 GHz as represented by spectrum 6000. This is accomplished according to an embodiment of the invention by splitting the spectrum 6000 into four overlapping regions 6100A from $f_0 \rightarrow f_1$, 6200A from $f_2 \rightarrow f_3$, 6300A from $f_4 \rightarrow f_5$, and 6400A from $f_6 \rightarrow f_7$. For purposes of processing these signals each region of spectrum 6000 is processed as indicated in FIG. 6B using a combination of receiver architectures. The maximum frequency $f_1$ within $f_0 \rightarrow f_1$ is specified to be less than half the sampling rate of the ADCs digitizing the process signals and therefore may be directly digitized without any frequency conversion using Direct Digitizer 6100B. Any frequency range that lies within $f_4 \rightarrow f_5$ is processed using a Direct Conversion receiver 6300B. In other words there is only one local oscillator used in the conversion process and its frequency is the same as the center frequency of the desired band. Any frequency range that lies within the block of frequencies $f_2 \rightarrow f_3$ and $f_6 \rightarrow f_7$ is converted using the super-heterodyne technique using Super-Heterodyne A 6200B and Super-Heterodyne B 6400B to an intermediate frequency (IF) that lies within the frequency range $f_4 \rightarrow f_5$ of the Direct Conversion receiver 6300B. In these two scenarios at least two local oscillators are active at any given time.

The overall receiver architecture is therefore a hybrid of direct-conversion and super-heterodyne receiver technologies together with direct digitization of the lowest frequency band having an upper frequency limit that does not exceed half the sampling rate of the ADCs. The direct-conversion receiver (DCR) acts as a back-end for all but the directly digitized range of frequencies $f_0 \rightarrow f_1$. It is also able to process the range of frequencies $f_4 \rightarrow f_5$ where the quadrature demodulator is generally a limiting factor that cannot process signals outside of this range. The super-heterodyne receiver stages, Super-Heterodyne A 6200B and Super-Heterodyne B 6400B, up- and down-convert RF signals outside of the range of frequencies covered by the DCR respectively, to frequency ranges that can be processed by the DCR. Accordingly, the approach provides the benefits of direct-conversion receivers, such as wide IBW, monolithic integration, etc. but extends their frequency range using super-heterodyne techniques to provide greater RF coverage. An example of this is provided below in respect of FIGS. 7 through 18.

Figure 7:
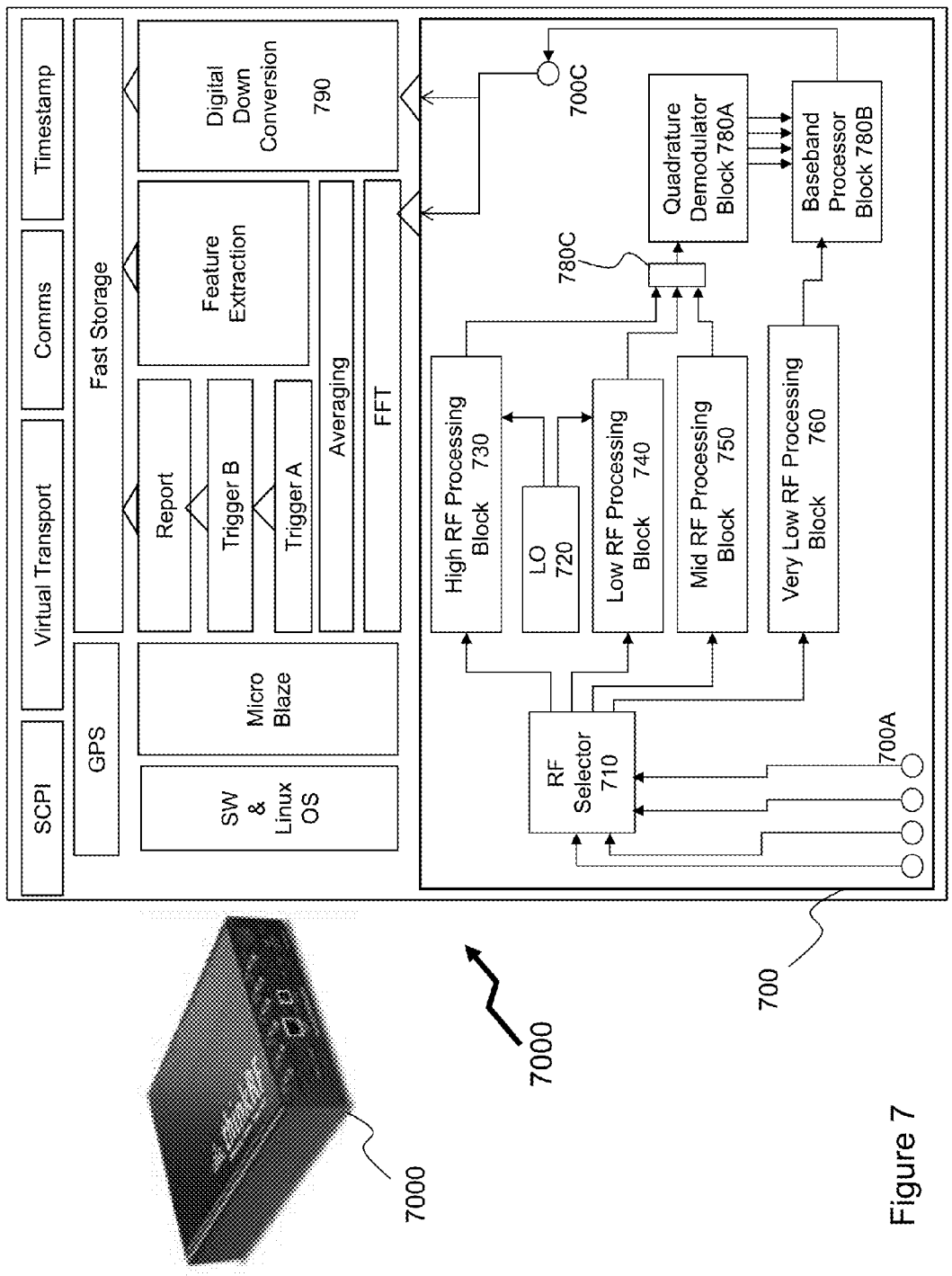
FIG. 7 depicts a RF front-end for a real time spectrum analyzer according to an embodiment of the invention.

Now referring to FIG. 7 there is depicted a RF front-end 700 for a RTSA 7000 according to an embodiment of the invention. RTSA 7000 having a similar structure as that described supra in respect of FIG. 6A from RF front-end 700 through to network interfaces with real-time signal capture, triggering, FFT etc. RTSA 7000 being a field deployable device approximately 230×165×55 mm with SMA connectors for antenna inputs. Optionally the RTSA 7000 may have a single or multiple antenna inputs according to the design of the RF front end 700. As shown a plurality of RF inputs 700A are coupled to an RF selector 710 that is coupled to High RF Processing Block 730, Mid RF Processing Block 740, Low RF Processing Block 750, and Very Low RF Processing Block 760. Accordingly the RF Selector 710 dynamically manages the connections between the RF inputs 700A and the multiple RF processing blocks that are allocated to frequency ranges within the overall 0.10 MHz to 8 GHz frequency range supported by the RTSA 7000 through the design of the RF front-end 700. Each of High RF Processing Block 730 and Low RF Processing Block 750 are shown coupled to Local Oscillator (LO) 720.

The processed signals from the High RF Processing Block 730, Mid RF processing block 750, and Low RF Processing Block 740 are coupled to selector 780C wherein they are coupled to quadrature demodulator block 780A and then baseband processor block 780B, the output of which is coupled to output 700C that feeds the FFT and Digital Down Conversion 790 portions of the RTSA 7000. The processed signal from Very Low RF Processing Block 760 is coupled directly to Baseband Processor Block 780B and thence to output 700C. In the discussions with respect to an RTSA operating 0.10 MHz to 8 GHz reference in FIGS. 8 through 17 will be made to characteristics of elements of the RF front end 720 which are examples of those for such an RTSA.

High RF processing block 730 processes an RF input signal over a range of frequencies by filtering, amplifying and/or attenuating it in stages and converting the center frequency of the signals under observation using at least one mixer to an intermediate frequency (IF). Similarly Low RF processing block 740 processes an RF input signal over a range of frequencies by filtering, amplifying and/or attenuating it in stages and converting the center frequency of the signals under observation using at least one mixer to an IF. Signals from processing blocks 730 or 740 are switched into the quadrature demodulator block 780 to be processed as a direct-conversion receiver would with an input signal centered at the IF frequency. Mid RF processing block 750 processes an RF signal over a range of frequencies by filtering, amplifying and/or attenuating it in stages. It should be noted that according to the embodiment of the invention described below in respect of FIGS. 8 through 18 only one RF processing block is active at any given time. However, it would be evident to one skilled in the art that other configurations would be possible including but not limited to, multiple RF processing blocks may be active through the addition of a switching stage between the RF front end 700 and subsequent FFT and Direct Digital Conversion 790 portions, having the FFT and Digital Down Conversion 790 portions active simultaneously on different/same RF processing blocks or block, and providing multiple FFT or Digital Down Conversion 790 portions coupled to different RF process blocks simultaneously.

Considering RTSA 7000 operating for RF signals between 0.10 MHz and 8 GHz frequency ranges for the processing circuits may for example be 3.0 GHz-8.0 GHz, 400 MHz-4.4 GHz, 40-1000 MHz and 0.1-50 MHz respectively for the High RF Processing Block 730, Mid RF Processing Block 740, Low RF Processing Block 750, and Very Low RF Processing Block 760.

It would be evident to one skilled in the art from the description of RTSA 600 above in respect of FIG. 6 that the 1024 user-defined center frequencies within the scan list may be processed by the RTSA software/firmware to a consolidated series of control settings for the RF front end 700. Further as each center frequency has associated with it user defined settings including but not limited to antenna selection, gain setting and dwell time then there would be a plurality of control signals to the RF front end 700. These have been omitted for clarity. The number of RF processing blocks employed together with their design configuration, performance, bandwidth, etc. may, it would evident to one skilled in the art, be varied according to the particular deployment scenario(s) and requirements.

Figure 8:
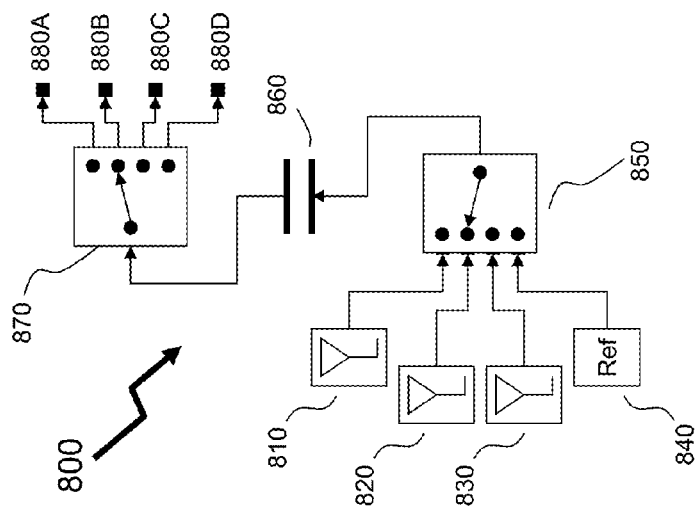
FIG. 8 depicts an RF antenna and RF front-end processing selector circuit according to an embodiment of the invention.

Referring to FIG. 8 there is depicted a RF antenna and RF front-end processing selector circuit 800 according to an embodiment of the invention, such as depicted by RF selector 710 in FIG. 7. Accordingly, first to third antennas 810 to 830 respectively are depicted coupled to a 4:1 switch 850 along with reference 840. Reference 840 in this embodiment being a test port through which a calibration signal may be applied to the RF front end circuit and processed by the RTSA allowing calibration of the RTSA and/or periodic verification. First to third antenna 810 to 830 may provide coverage of the full 0.1 MHz to 8 GHz frequency range of an RTSA within which the RF antenna and RF front-end processing selector circuit 800 is operating or provide different bands according to the deployment scenario of the RTSA. The output of 4:1 switch 850 is coupled via DC block 860 to 1:4 switch 870 having first to fourth outputs 880A through 880D which where the RF front end 700 is being implemented means that these outputs are connected to High RF Processing Block 730, Mid RF Processing Block 740, Low RF Processing Block 750, and Very Low RF Processing Block 760. First to third antennas 810 to 830 respectively for an RTSA 7000 operating 0.10 MHz to 8 GHz may be operable at 0.10 MHz to 800 MHz, 400 MHz to 4 GHz, and 2 GHz to 8 GHz respectively according to an embodiment. Alternatively antennas may have identical frequency coverage but with different directional characteristics.

Figure 9:
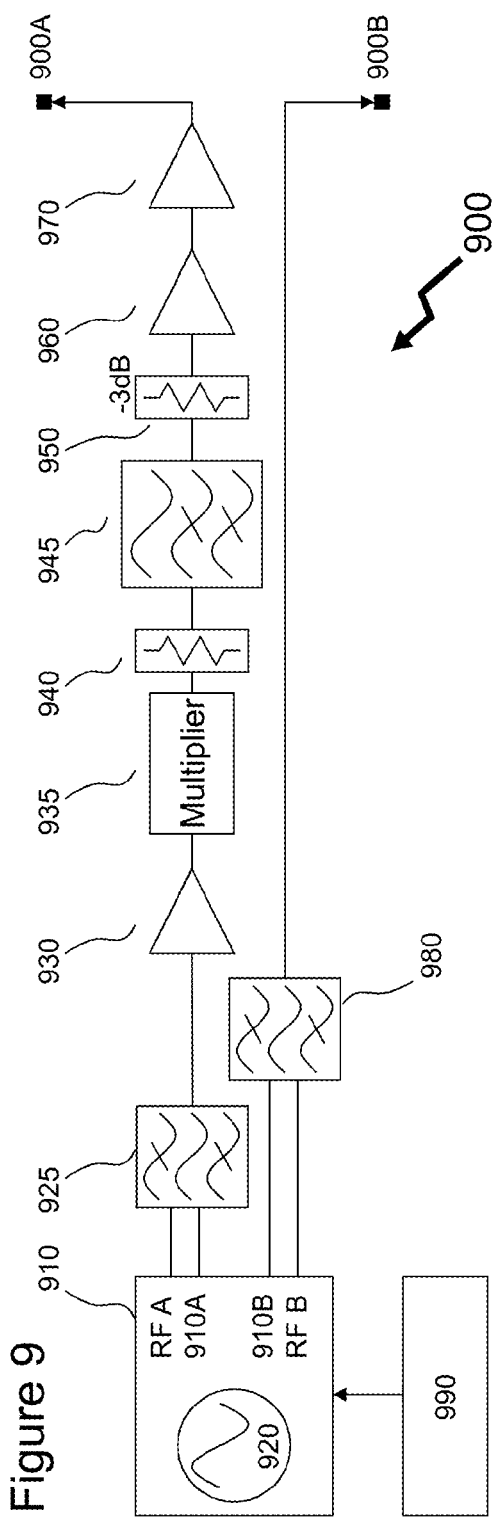
FIG. 9 depicts a local oscillator and distribution circuit according to an embodiment of the invention.

Referring to FIG. 9 there is depicted a local oscillator (LO) circuit 900 according to an embodiment of the invention, LO circuit 900 being an implementation of LO circuit 720 in FIG. 7 for the RF front end 700 within RTSA 7000. As depicted an oscillator 920 provides two outputs at first and second ports 910A and 910B respectively at a frequency determined from a digital control circuit 990, for example between 1.0 GHz and 4.5 GHz. Second port 910B is coupled via first passband filter 980 to a second oscillator output port 900B which as depicted in FIG. 7 is coupled to Low RF Processing Block 740. First output port 910A is similarly coupled to a second passband filter 925 and thence to amplifier 930, frequency multiplier 935, first attenuator 940, highpass filter 945, 3 dB attenuator 960 and then amplifier cascade comprising first and second LNAs 960 and 970 respectively. Accordingly at first oscillator output port 900A a frequency multiplied and amplified output of the oscillator 920 is provided, according to FIG. 7, to the High RF Processing Block 730.

Within the discussions for an RTSA operating over 0.10 MHz to 8 GHz the output from first oscillator output port 900A may for example be set to range from 4 GHz to 9 GHz Within the above embodiment first and second passband filters 980, 925, and highpass filter 945 are shown as fixed. However, according to the operating frequency range of the RTSA and accordingly first and second output ports 900A and 900B respectively and existing tunable filter technologies these may be replaced with tunable filters which would be coupled to digital control circuit 990 allowing their centre frequency, as well as other characteristics including but limited to bandwidth, to be adjusted in dependence upon the intended setting for LO circuit 900. With tunable filter technology enhancements the applicable operating frequency range for these tunable filters will evolve thereby allowing evolution of the LO circuit 900 accordingly.

Figure 10:
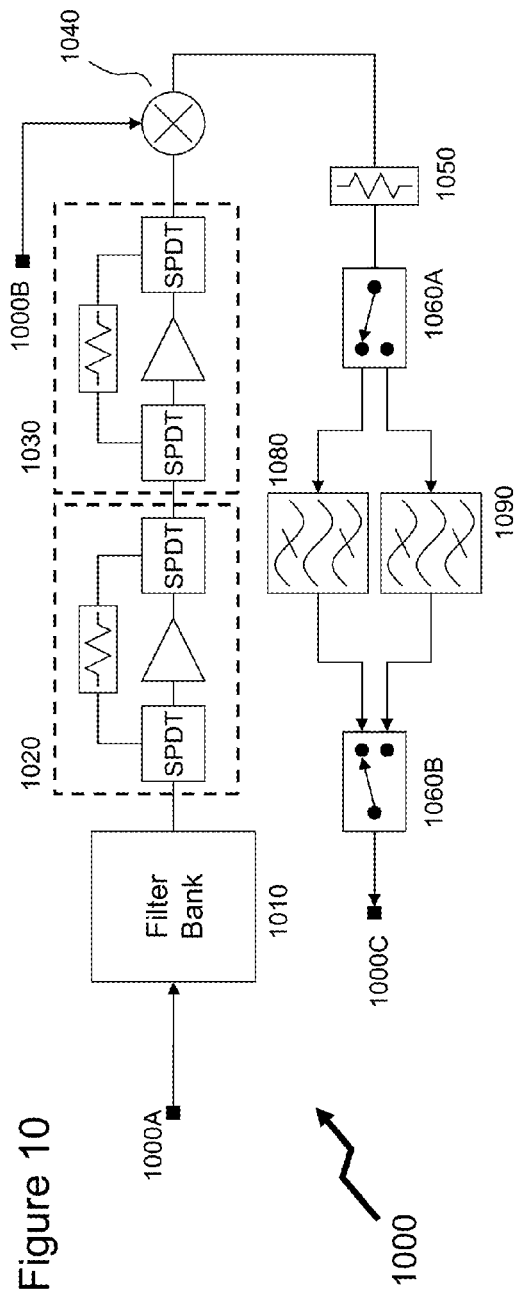
FIG. 10 depicts a high-RF processing circuit according to an embodiment of the invention.

Now referring to FIG. 10 there is depicted a high RF processing circuit 1000 according to an embodiment of the invention, such as High RF Processing Block 730 which forms part of RF front end 700 within RTSA 7000. Accordingly high RF processing circuit 1000 receives at an input port 1000A a signal, for example the RF signals coupled from first port 880A of RF antenna and RF front-end processing selector circuit 800, which is then coupled to a filter bank 1010. The output of filter bank 1010 is sequentially coupled to first gain block 1020 and second gain block 1030 before being coupled to mixer 1040. The mixer 1040 receiving also a signal from port 1000B such that the output from the mixer 1040 is a down-converted spectrum of the RF signals coupled to the input port 1000A. As depicted in FIG. 7 for RF front end 700 the port 1000B would be coupled to the LO circuit 720, for example as depicted in FIG. 9 to output 900A of LO circuit 900.

The down-converted signal from the mixer 1040 is then coupled via an attenuator 1050 to a switched first intermediate frequency (IF) filter bank comprising first and second 1:2 switches 1060A and 1060B respectively that select either a first path with first filter 1080 or second path with second filter 1090. Within the embodiment of an RTSA operating 0.10 MHz to 8 GHz with 4 GHz to 9 GHz local oscillator applied to the mixer 1040 first filter 1080 may for example be a 1300 MHz SAW filter and second filter a 2300 MHz SAW filter. The resulting filtered down-converted signal is then coupled to output 1000C of the high RF processing circuit 1000.

Figure 11:
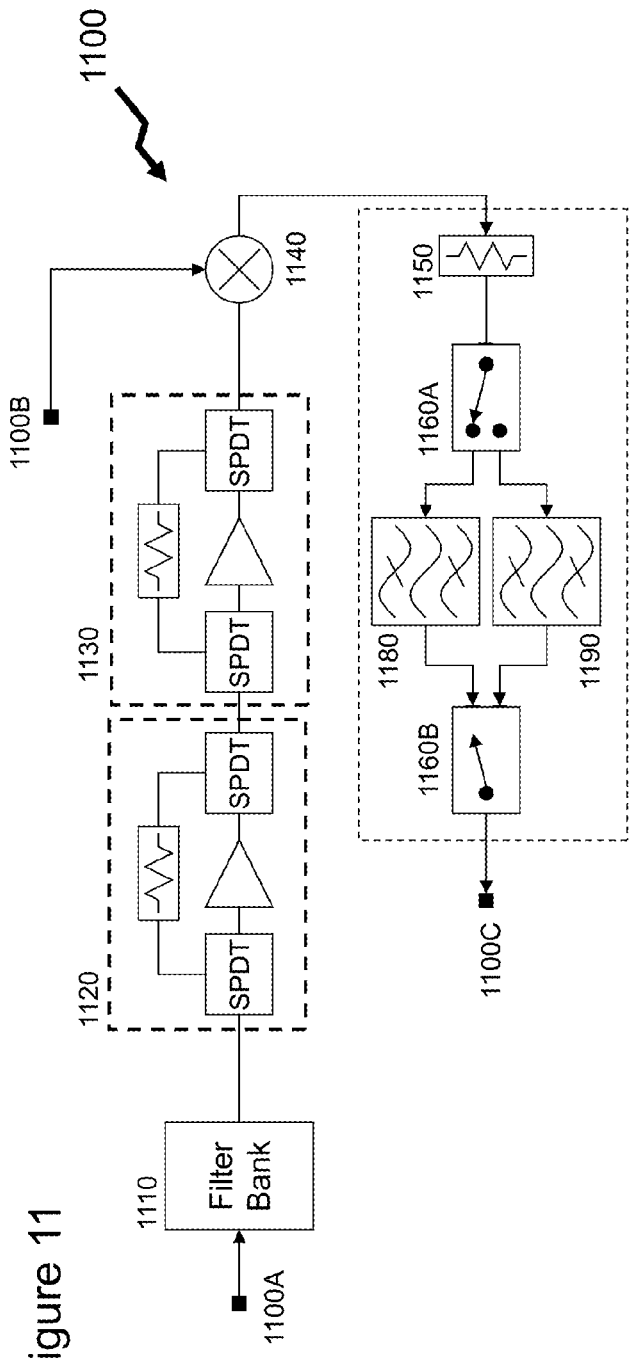
FIG. 11 depicts a low-RF processing circuit according to an embodiment of the invention.

Referring to FIG. 11 there is depicted a low RF processing circuit 1100 according to an embodiment of the invention, such as Low RF Processing Block 740 which forms part of RF front end 700 within RTSA 7000. Accordingly low RF processing circuit 1100 receives at an input port 1100A a signal, for example the RF signals coupled from third port 880C of RF antenna and RF front-end processing selector circuit 800 in FIG. 8, which is initially filtered by filter bank 1110 prior to being coupled to cascaded first and second gain stages 1120 and 1130. The resulting filtered and amplified signal is then coupled to mixer 1140 together with a local oscillator signal coupled to the low RF processing circuit 1100 via oscillator port 1100B. The resulting up converted signal being coupled to output 1100C. The local oscillator signal coupled to oscillator port 1100B being coupled from the second oscillator output port 900B of local oscillator circuit 900 and within the frequency range 1300 MHz to 2300 MHz. The output signal from the mixer 1140 is then coupled via an attenuator 1150 to a switched first intermediate frequency (IF) filter bank comprising first and second 1:2 switches 1160A and 1160B respectively that select either a first path with first filter 1180 or second path with second filter 1190.

Figure 12:
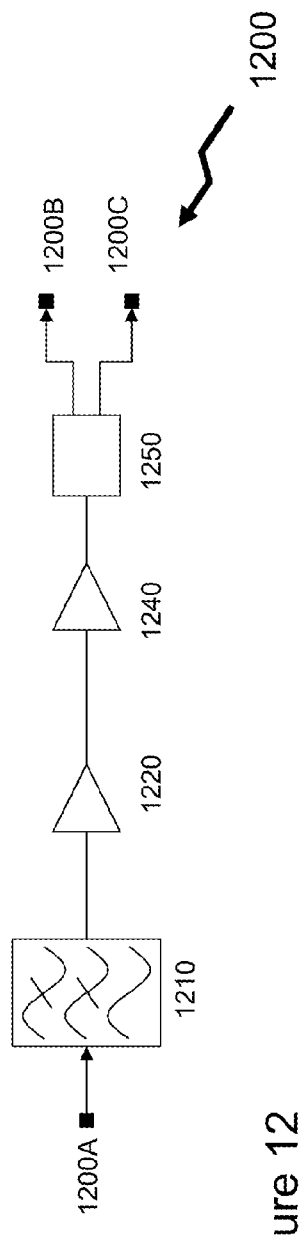
FIG. 12 depicts a very low-RF processing circuit according to an embodiment of the invention.

Now referring to FIG. 12 there is depicted a very low RF processing circuit 1200 according to an embodiment of the invention, such as Very Low RF Processing Block 760 which forms part of RF front end 700 within RTSA 7000. Accordingly very low RF processing circuit 1200 receives at an input port 1200A a signal, which is initially filtered by low pass filter 1210. The signals at input port 1200A for example being for example the RF signals coupled from fourth port 880D of RF antenna and RF front-end processing selector circuit 800 in FIG. 8 for Very Low RF Processing Block 760 in FIG. 7. The filtered signal is coupled to amplifier cascade 1220 and 1240, the output of 1240 is then coupled to a transformer 1250 which provides dual differential outputs 1200B and 1200C respectively.

Figure 13:
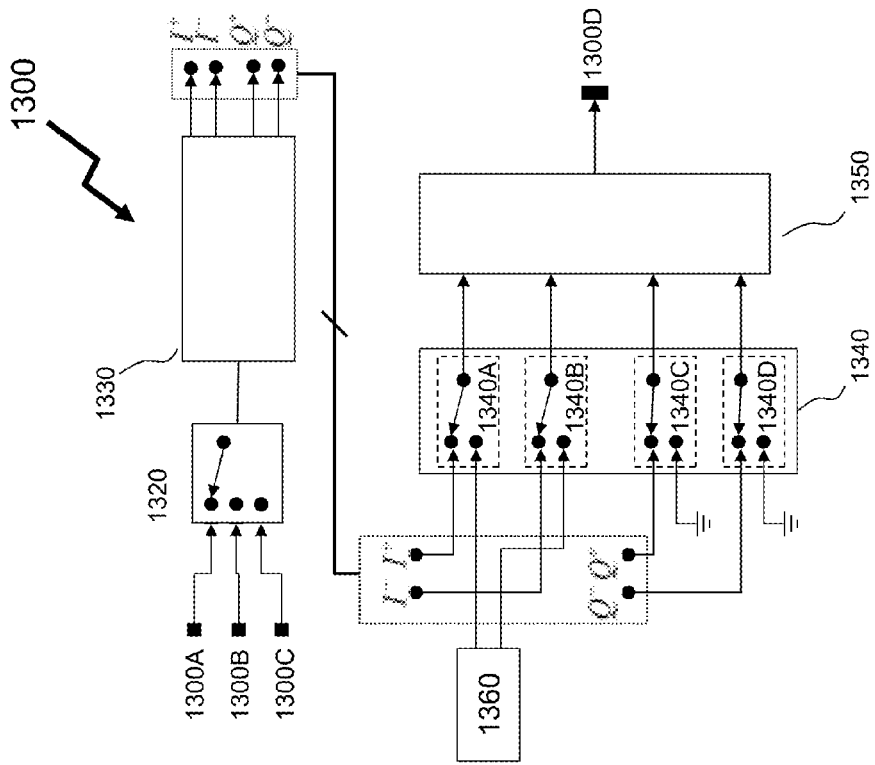
FIG. 13 depicts a RF front-end combiner circuit according to an embodiment of the invention.

Now referring to FIG. 13 there is depicted an RF combiner circuit 1300 according to an embodiment of the invention such as 780 in FIG. 7 comprising switch 780C, quadrature demodulator 780A, and baseband processor 780B. Accordingly a RF combiner circuit 1300 is depicted with first, second and third input ports 1300A 1300B and 1300C respectively, coupled to a 3:1 switch 1320 selecting one of these input ports and coupling the associated signals to quadrature demodulator block 1330, described in more detail in FIG. 14 below, wherein the outputs from the quadrature demodulator 1330 are then coupled to a quad 2:1 switch array 1340 which couples to baseband processing circuit 1350, described in more detail in FIG. 16 below. Processing circuit 1350 generating a processed signal that is coupled to output 1300D, which by reference to FIG. 16 which presents an embodiment of the processing circuit 1350, namely baseband processing circuit 1600, the output 1300D is the output of the ADCs 1695A and 1695B.

Figure 15:
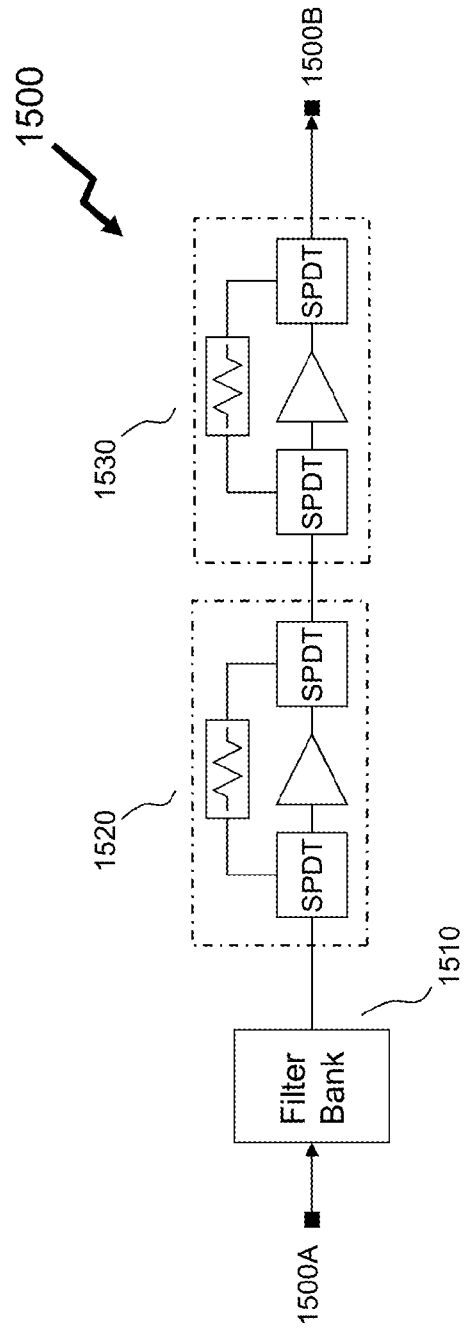
FIG. 15 depicts a mid-RF processing circuit according to an embodiment of the invention.

First, second and third input ports 1300A, 1300B and 1300C being coupled to the output of High RF Processing Block 730, such as depicted by high RF processing circuit 1000 in FIG. 10, Mid RF Processing Block 740, such as depicted by mid RF processing circuit 1500 in FIG. 15, and Low RF Processing Block 750 such as depicted by low RF processing circuit 1100 in FIG. 11. The quadrature output signals (I+, I−, Q+ and Q−) from quadrature demodulator block 1330 are coupled to four 2:1 multiplexers 1340A through 1340D respectively. The other ports of 2:1 multiplexer 1340A and 1340B are coupled to processing circuit 1360 which in the exemplary RF front end 700 of RTSA 7000 would be Very Low RF Processing Block 760, such as depicted by very low RF processing circuit 1200. The other port of 2:1 multiplexers 1340C and 1340D are connected to ground. Optionally, these ports may be coupled to another RF processing block. Accordingly RF combiner circuit 1300 dynamically selects one of the processing circuits within the RF front end, such as RF front end 700 in RTSA 7000. The processing circuit to be selected being determined in dependence of the current active user-defined center frequency.

Figure 14:
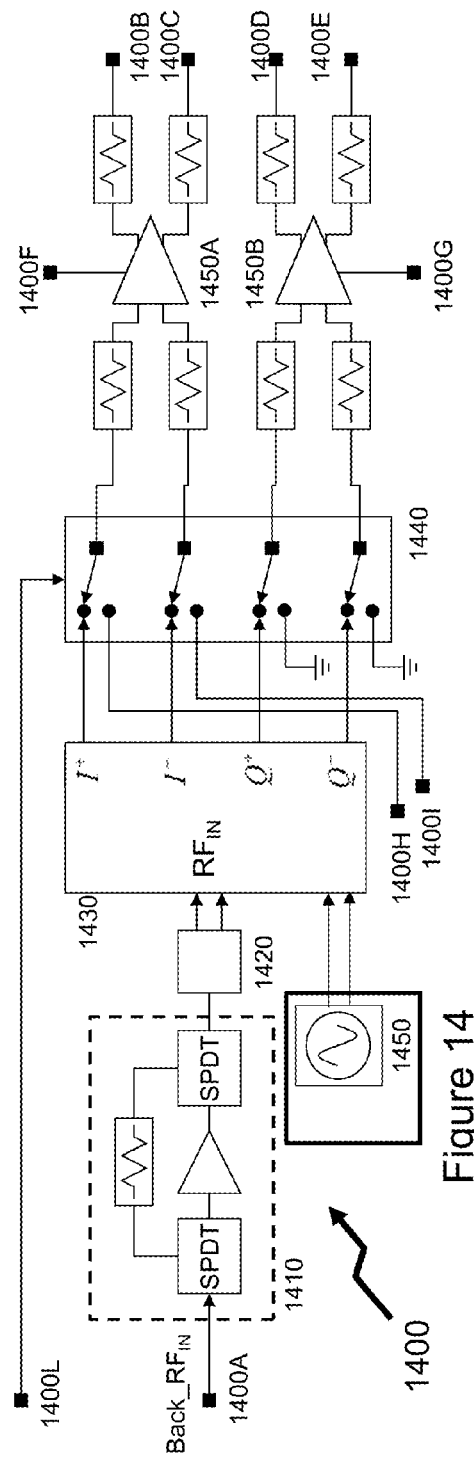
FIG. 14 depicts a demodulator and processing circuit forming part of the RF front-end combiner circuit depicted in FIG. 13 according to an embodiment of the invention.

Referring to FIG. 14 there is depicted quadrature demodulator block 1430 and gain/attenuation block 1410 in processing circuit 1400 forming part of the circuit 1300 depicted in FIG. 13 according to an embodiment of the invention. Quadrature demodulator and processing circuits 1410, 1420 and 1430 being equivalent to processing block 1330 in FIG. 13. Accordingly quadrature demodulator and processing circuit 1400 comprises an input port 1400A receiving the signals selected by the preceding 3:1 switch 1320 in circuit 1300. The received signal at input port 1400A is coupled to a gain block 1410 and then to balun 1420, the outputs of which are coupled to quadrature demodulator 1430 that provides four outputs (I+, I−, Q+ and Q−), each output coupled to a different 2:1 multiplexer in a quad 2:1 multiplexer array 1440. Quadrature demodulator 1440 includes a phase locked loop (PLL) which receives local oscillator (LO) signals from local oscillator 1450.

The second port of the first two 2:1 multiplexers in quad 2:1 multiplexer array 1440 being coupled to first and second LF ports 1400H and 14001 respectively, which within RF front end 700 of RTSA 7000 are connected to the dual output ports 1200B and 1200C of Very Low RF Processing Block 1200. The second port of the second pair of 2:1 multiplexers in quad 2:1 multiplexer array 1440 being connected to ground but optionally may be coupled to the dual output ports of another RF processing block. Quad 2:1 multiplexer array 1440 being controlled via a Mid_Verylow_Select control coupled to the quadrature demodulator and processing circuit 1400 via control port 1400L. The outputs from the first and second 2:1 multiplexers within quad 2:1 multiplexer array 1440 are coupled to first differential amplifier 1450A and thence to first and second output ports 1400B and 1400C respectively. The outputs from the third and fourth 2:1 multiplexers within quad 2:1 multiplexer array 1440 are coupled to second differential amplifier 1450B and thence to third and fourth output ports 1400D and 1400E respectively.

Referring to FIG. 15 there is depicted a mid-RF processing circuit 1500 according to an embodiment of the invention such as Mid RF Processing Block 750 in RF front end 700 of RTSA 7000 in FIG. 7. Accordingly a signal coupled to the input port 1500A is coupled to filter bank 1510 and then amplifier cascade comprising first and second amplifiers 1520 and 1530 respectively to the output port 1500B. Within the RF front end 700 the input port 1500A would be coupled to the second output port 880B of the RF antenna and RF front-end processing selector circuit 800, and the output port 1500B would be coupled to the 3:1 switch 1320 in circuit 1300 in FIG. 13.

Figure 16:
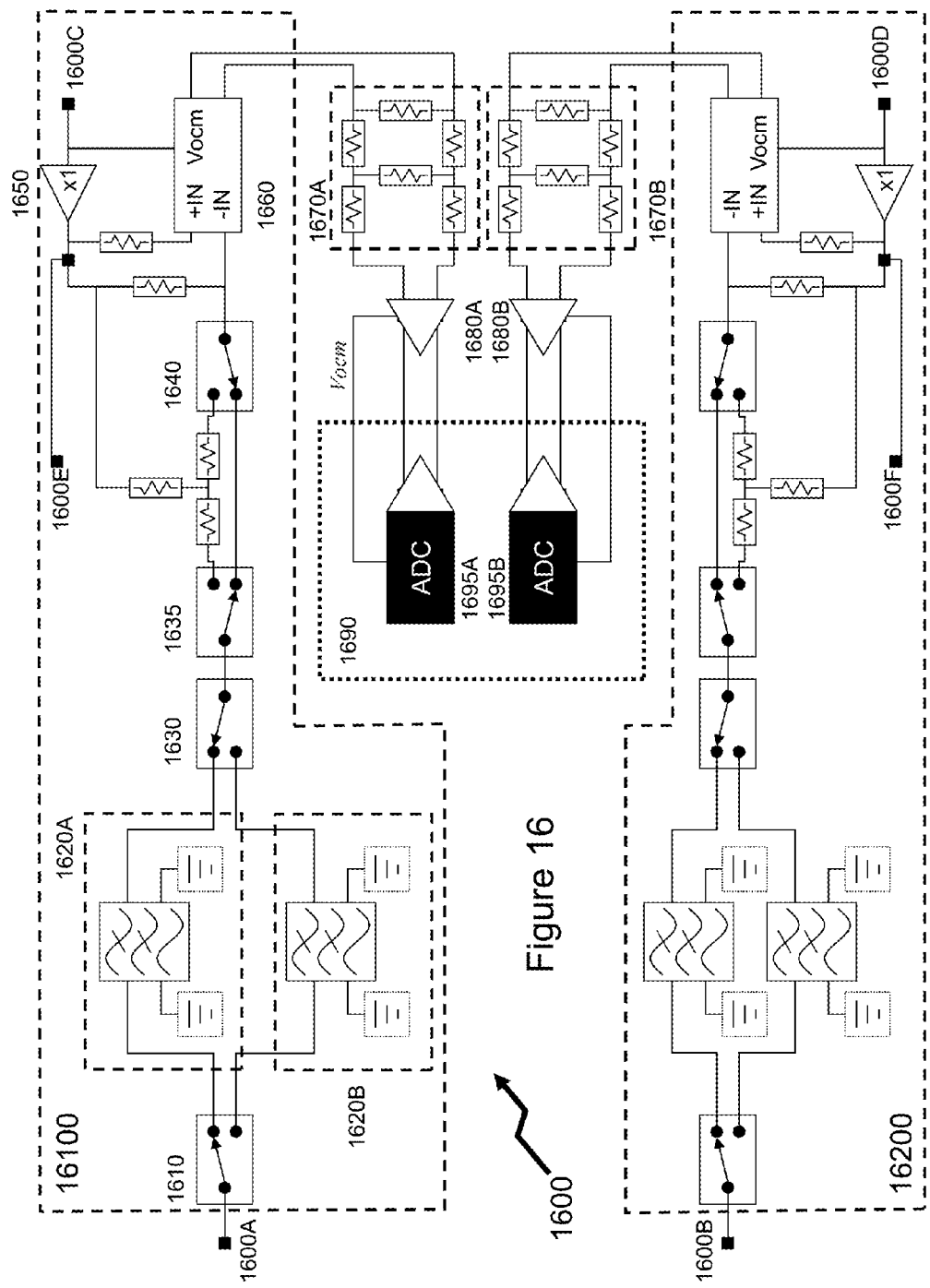
FIG. 16 depicts an RF processing circuit forming part of the RF front-end combiner circuit depicted in FIG. 13 according to an embodiment of the invention.

Referring to FIG. 16 there is depicted a baseband processing circuit 1600 forming part of the circuit 1300 depicted in FIG. 13 according to an embodiment of the invention. Baseband processing circuit 1600 implements processing circuit 1350 according to an embodiment of the invention and comprises first and second identical baseband processor circuits 16100 and 16200 respectively coupled differentially through a series of gain, variable or fixed, and/or attenuation stages, variable or fixed, to digitizer circuit 1690 consisting of two ADCs 1695A and 1695B. RF processor circuit 16100 comprises input ports 1600A coupled to first 1:2 switches 1610 that selects either low pass filter 1620A or low pass filter 1620B.

Post filtered signals are then coupled via back-to-back 1:2 switches 1630 and 1635 to either a T-network attenuator or no gain. The output of this stage is coupled via 2:1 switch to a baseband variable gain amplifier 1660. Differential outputs from 1660 are coupled through a resistor network to an operational amplifier and then to analog-to-digital converter 1695A.

Figure 17:
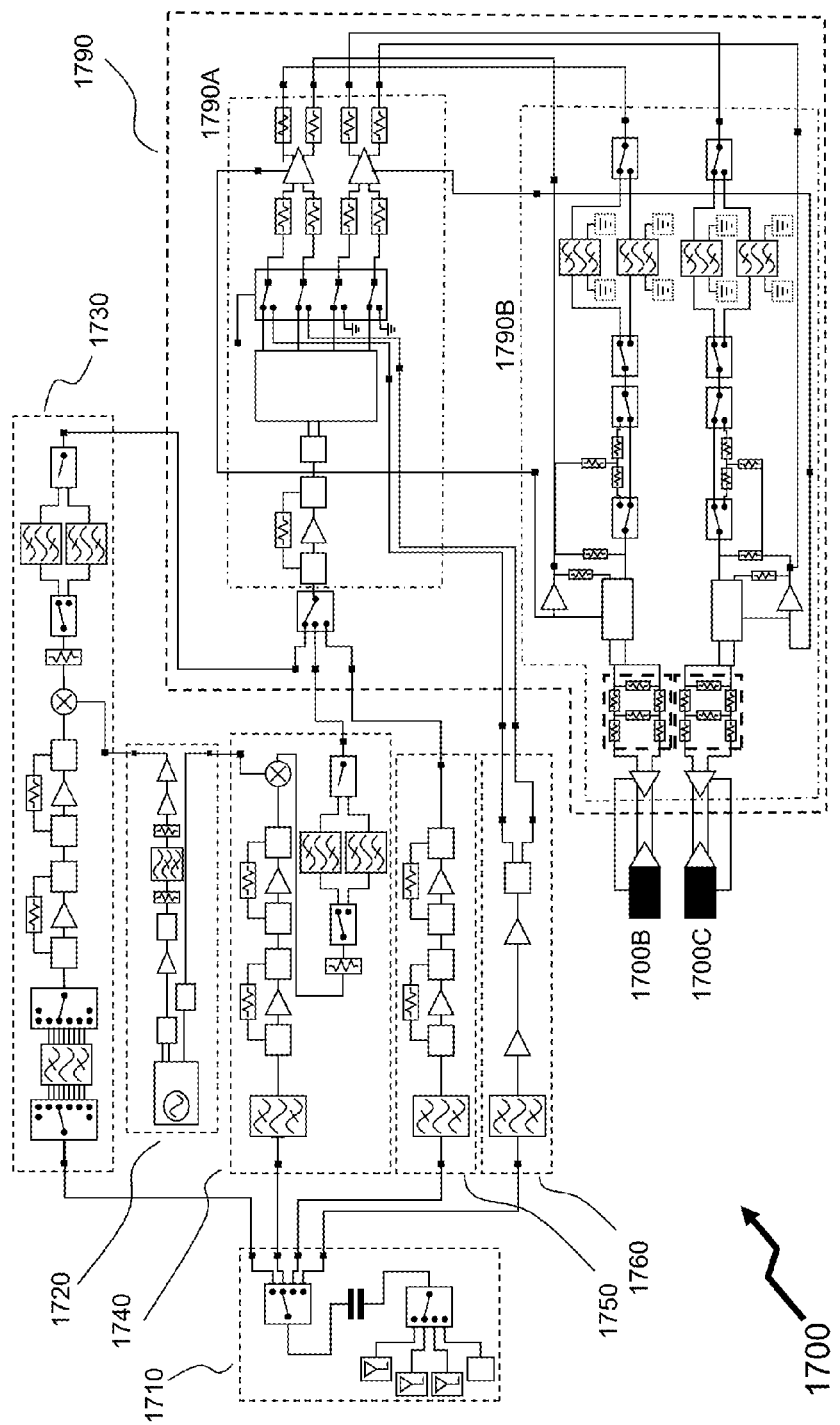
FIG. 17 depicts an RF front-end circuit according to an embodiment of the invention.

Now referring to FIG. 17 there is depicted an RF front-end circuit 1700 according to an embodiment of the invention employing the circuit elements described supra in respect of FIG. 8 through 16. Accordingly there are depicted the following circuits:

RF selector circuit 1710 as described in FIG. 8 with respect to RF antenna and RF front-end processing selector circuit 800 providing the functionality of RF selector 710 in FIG. 7;

a local oscillator (LO) circuit 1720 as described in FIG. 9 with respect to LO circuit 900 providing the functionality of LO circuit 720 in FIG. 7;

high RF circuit 1730 as described in FIG. 10 with respect to high RF processing circuit 1000 providing the functionality of High RF Processing Block 730 and operating 3.0 GHz-8.0 GHz and fed from RF selector circuit 1710;

mid RF circuit 1740 as described in FIG. 11 with respect to mid RF processing circuit 1100 providing the functionality of Mid RF Processing Block 740 and operating 400 MHz-4400 MHz and fed from RF selector circuit 1710;

low RF circuit 1750 as described in FIG. 15 with respect to mid-RF processing circuit 1500 providing the functionality of Low RF Processing Block 750 and operating 40-1000 MHz and fed from RF selector circuit 1710;

very low RF circuit A 1760 as described in FIG. 12 with respect to very low RF processing circuit 1200 providing the functionality of Very Low RF Processing Block 1760 and operating 0.1-50 MHz and fed from RF selector circuit 1710 and quadrature demodulator circuit 1790 comprising demodulator circuit 1790A as described in FIG. 14 with respect to quadrature demodulator and processing circuit 1400 providing the functionality of Demod 780A and amplified filter multiplexer circuit 790B as described in FIG. 16 with respect to RF processing circuit 1600.

Quadrature demodulator circuit 1790 receives the processed RF signals from high RF circuit 1730, mid RF circuit 1740, low RF circuit 1750, very low RF circuit 1760 and provides digital outputs 1700B and 1700C representing the analog input signals of interest to subsequent digital processing circuits, such as FFT 665 and Digital Down Conversion 665 depicted in FIG. 6A with respect to RTSA 600. These 8 circuits, or 9 if count the two circuit sections of quadrature demodulator circuit 1790, provide according to an embodiment of the invention a RF receiver for a RTSA such as RF front-end 700 for RTSA 7000 or RF front end 620 for RTSA 600 as described above in respect of FIGS. 7 and 6 respectively.

Figure 18:
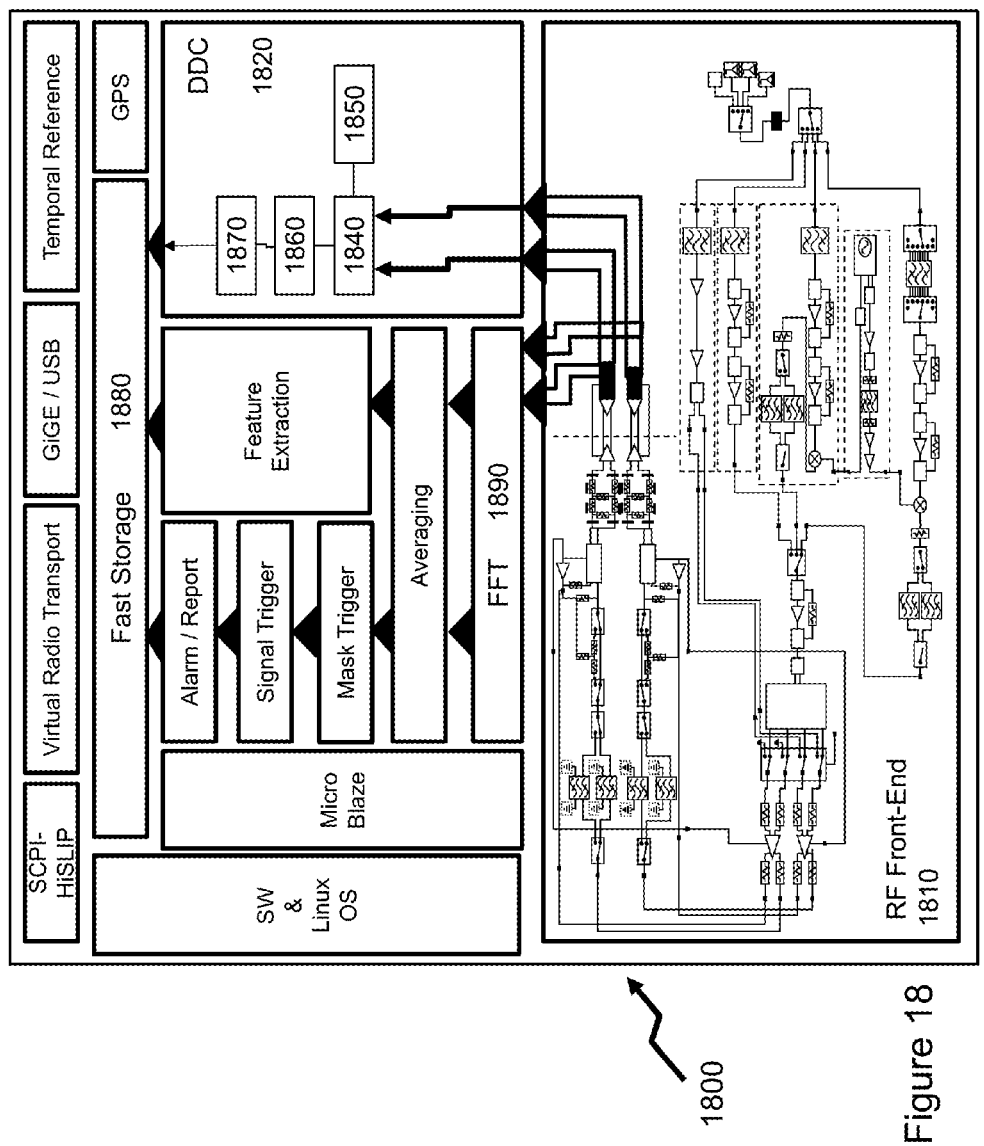
FIG. 18 depicts a real time spectrum analyzer comprising the RF front-end circuit of FIG. 17 in combination with a digital down conversion circuit according to an embodiment of the invention.

Referring to FIG. 18 there is depicted a RTSA 1800 comprising an RF front-end 1810, such as RF front-end circuit 1700 of FIG. 17 wherein the processed and digitized baseband signals processed by the RF front-end circuit 1810 are coupled to a FFT block 1890 and a digital down conversion (DDC) block 1820 according to an embodiment of the invention. Digitized signals are input to two complex multipliers in block 1840 which also receives inputs from complex oscillators block 1850. The resulting down-converted output from complex multiplier 1840 is coupled via low pass filters in block 1860 to decimators in block 1870 wherein the decimated down-converted digital signal data is coupled to fast storage 1880 comprising digital memory allowing the signal data to be stored for subsequent processing by the RTSA 1800 or transmission from the RTSA 1800 to a remote server.

Figure 19:
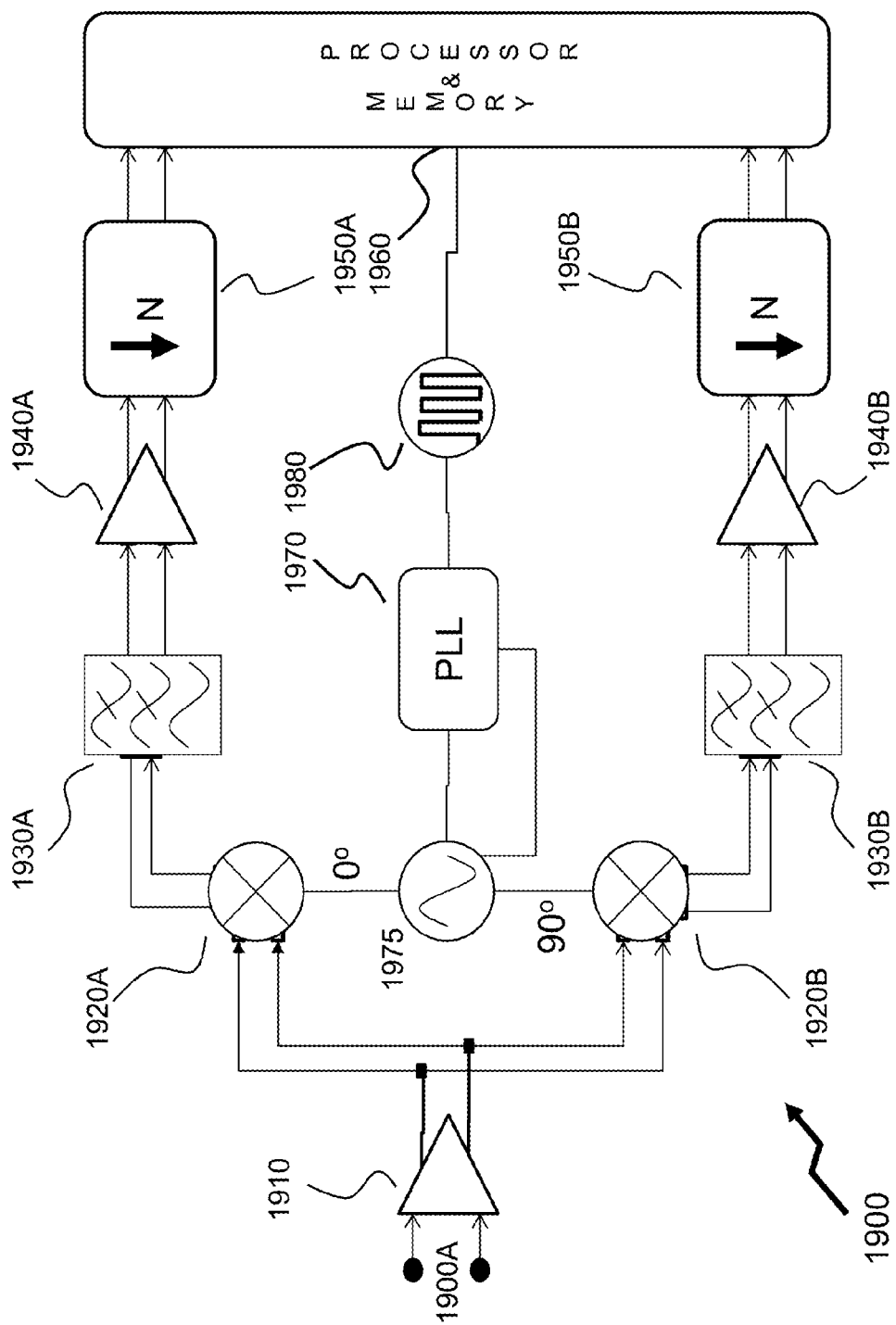
FIG. 19 depicts a digital down conversion circuit according to an embodiment of the invention.

Referring to FIG. 19 there is depicted a digital down conversion circuit (DDC) 1900 according to an embodiment of the invention for implementing the DDC feature such as presented above in respect of DDC block 1820, DDC 665 and DDC 790 in FIGS. 18, 6, and 7 respectively. As shown a differential input is received at input 1900A and amplified by fully-differential amplifier 1910 before being down-converted with first and second complex mixers 1920A and 1920B that are fed from complex oscillator 1975 at 0° and 90° respectively. The complex oscillator 1975 being controlled through a phase locked loop (PLL) 1970. The PLL 1970 driven by clock 1980 which is controlled by a processor in memory and processor block 1960.

The down-converted signals from the first and second complex mixers 1920A and 1920B are coupled to first and second low pass filters 1930A and 1930B before being coupled to first and second gain blocks 1940A and 1940B respectively. These differential amplifier outputs are coupled to first and second decimators 1950A and 1950B respectively, the outputs of which are forwarded to the memory and processor block 1960. The first and second decimators 1950A and 1950B execute a decimation process, this being a reduction in the number of samples of the discrete-time signals generated from the complex mixers that have been amplified and low-pass filtered. Decimation being implemented as part of a two-step process comprising a low-pass anti-aliasing filter and downsampling.

Referring to FIG. 20 there is depicted a DDC 2000 according to an embodiment of the invention capable of being implemented in a Field Programmable Gate Array (FPGA) circuit. The first stage of the DDC 2000 uses a digital mixer to frequency translate a specific channel frequency down to baseband using a pair of multipliers 2010 and 2020 in conjunction with a Direct Digital Synthesizer (DDS) 2030 which provides the signals to be mixed with the input signal. This function enables the device comprising the DDC 2000, such as RTSA 600 or RTSA 7000 in FIGS. 6 and 7 respectively, to tune the DDC 2000 to the desired frequency of interest (channel). The second stage of the DDC 2000 reduces the sample rate of the signal to match the desired channel output bandwidth using a Cascaded Integrator Comb (CIC) Sample Rate Adjustment filter 2040 to decimate the data. A second CIC Gain Adjustment filter 2050 provides a coarse gain adjustment stage for the decimate signals. These signals are then passed to a pair of additional polyphase filters, being Compensation Finite Impulse Response (CFIR) filter 2060 and Programmable Finite Impulse Response (PFIR) filter 2070. This CFIR-PFIR filter pair provides additional decimation and final signal shaping prior to a rounding stage, with rounder 2080, and final output.

The function blocks of the DDC 2000 are primarily implemented using multipliers. As today's FPGAs include a wealth of DSP function blocks that are primarily multipliers and according the DDC 2000 may be mapped onto an FPGA. Additionally, the general-purpose logic resource and on-chip memory of FPGAs also match the requirements of the DDC for implementing the required FIR filters and their associated filter coefficient tables. Optionally, the DDC 2000 may be implemented with an Application Specific Integrated Circuit (ASIC). With evolving generations of higher-performance FPGAs where processing precision continues to increase therefore enabling IP-based DDCs to outperform ASIC-based solutions in many instances in specification items like better Spurious Free Dynamic Range.

From the design of a RTSA implementing the DDC as well as other elements of the RTSA after the RF front-end provides the ability to implement many channels of DDC into one, two or more FPGAs allowing a reduction in board count, power requirements, and cost over a solution that may require tens of individual ASIC chips to provide the same number of channels and performance. Additionally, FPGA solutions can be flexible by supporting vastly different signals with the simple load of an IP core and reusing the same hardware platform.

FPGAs are not a perfect match for all requirements, as they show the greatest advantages in systems with high channel densities and typically narrower bandwidths where many DDC channels can fit on a single FPGA. In systems with just one or two channels and very wide bandwidths in the range of 100 MHz or greater, the cost of the FPGAs needed to fit the larger wideband DDC core(s) might exceed the cost of designing the system with a single multi-channel DDC ASIC. Accordingly whilst cost, size, and power are important factors in designing a receiver system, ultimately the technical requirements of the RTSA may dictate the choice of whether an ASIC or FPGA is used.

Referring to FIG. 21 there is depicted a cascaded integrator comb (CIC) 2100 forming part of the digital down conversion circuit according to an embodiment of the invention. CIC 2100 comprising a series of integrators 2110 clocked at a first clock rate of $f_C$, a rate reducer 2120, and a series of combs 2130 clocked at a second clock rate of $f_C/R$. An integrator 2110 being a single-pole infinite impulse response (IIR) filter with a unity feedback coefficient as given by Equation 1 below and has a transfer function given by Equation 2.

$$y(n) = y(n-1) + x(n) \qquad (1)$$

$$H_I(z) = \frac{1}{1-z^{-1}} \qquad (2)$$

The power response of integrator 2110 is basically a low-pass filter with a −20 dB per decade (−6 dB per octave) roll-off but with infinite gain at DC. The comb 2130 running at a sampling rate $f_C$ for a rate change is an odd-symmetric finite impulse response (FIR) described by Equation 3 below with corresponding transfer function given in Equation 4.

$$y(n)=x(n)-x(n-RM) \qquad (3)$$

$$H_C(z)=1-z^{-RM} \qquad (4)$$

where M is the differential delay and can be any positive integer, but is usually 1 or 2. When R=1 and M=1 the power response of comb 2130 is a high-pass filter with 20 dB per decade gain.

A CIC filter 2100 may be implemented without the rate changer 2120 but "pushing" the comb sections to after the rate changer 2120 allows them to have a transfer function as given by Equation 5 but at a slower sampler rate $f_C/R$. Beneficially such a CIC 2100 with integrators 2110 before, and combs 2130, after a rate changer 2120 makes these elements independent of the rate change. Accordingly, CIC 2100 may be implemented with a programmable rate change with the same filtering structure allowing, for example the CIC Sample Rate Adjustment filter 2040 to decimate with varying decimation. For example, a DDC within an RTSA may be programmable for example with a decimation up to $2^{13}=8192$.

Accordingly, the transfer function for a CIC filter, such as CIC 2100, operating as is given by Equation 5 below which shows that even though a CIC filter has integrators in it, which by themselves have an infinite impulse response, the CIC filter is actually equivalent to N finite impulse response (FIR) filters, each having a rectangular impulse response. Hence, as all the coefficients of these FIR filters are unity, and symmetric, the CIC filter has a linear phase response and a constant group delay. Accordingly the magnitude of the output of the filter can be shown to given by Equation 6 below.

$$H(z) = H_I^N(z)H_C^N(z) = \frac{(1-z^{-RM})^N}{(1-z^{-1})^N} = \left(\sum_{k=0}^{RM-1} z^{-k}\right) \qquad (5)$$

$$H(f) \approx \left|RM\frac{\sin(\pi Mf)}{\sin\frac{\pi f}{R}}\right|^N \qquad (6)$$

Approximating $\sin(x) \approx x$ for small x then for large Equation 6 becomes that in Equation 7 such that the output spectrum of the CIC has nulls at multiples of f=1/M. Further the passband attenuation is a function of the number of stages and hence whilst increasing the number of stages improves the imaging/alias rejection of the filter it also increases the passband "droop", and the DC gain is function of the rate change R such that appropriate selection of R, M, and N. Considering, a CIC decimator such as CIC Sample Rate Adjustment filter 2040 in FIG. 20, then the gain G at the output is $G=(RM)^N$ where, assuming two's complement arithmetic, the number of output bits, $B_{OUT}$, is given by Equation 8. A more extensive analysis and consideration of CIC filters can be found in the prior art including for example E. Hogenauer in "An Economical Class of Digital Filters for Decimation and Interpolation" (IEEE Trans. Acoustics, Speech and Signal Processing, ASP-29(2), pp 155-162, 1997).

$$H(f) = \left|RM\frac{\sin(\pi Mf)}{\sin\pi Mf}\right|^N \text{ for } 0 \le f \le \frac{1}{M} \qquad (7)$$

$$B_{OUT} = [N \log_2 RM + B_{IN}] \qquad (8)$$

where $B_{IN}$ is the number of input bits.

Figure 22:
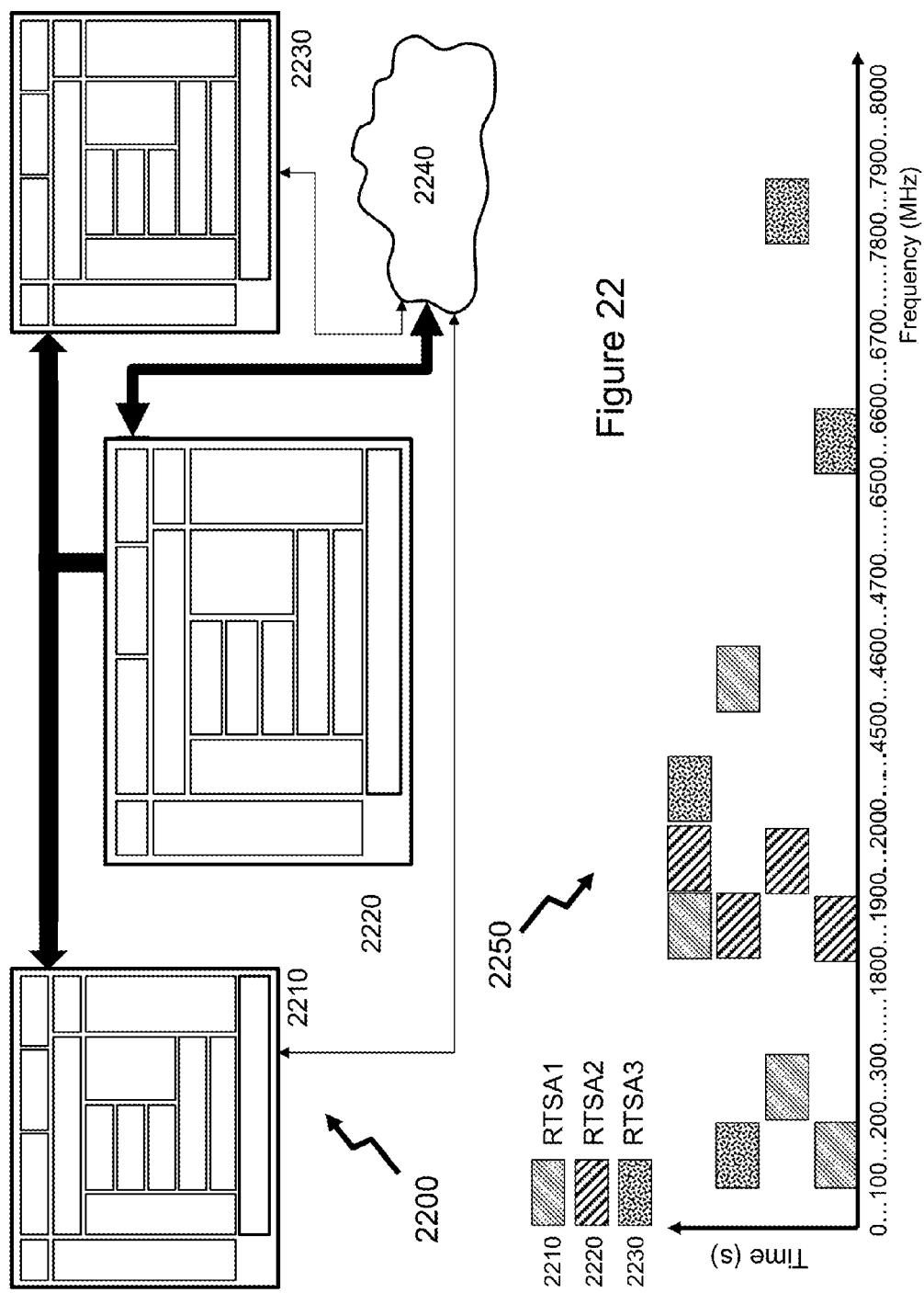
FIG. 22 depicts the interfacing of multiple real time spectrum analyzers according to embodiments of the invention to provide enhanced spectral monitoring and processing.

Now referring to FIG. 22 there is depicted a RTSA array 2200 incorporating first to third RTSAs 2210 to 2230 respectively. First and third RTSAs 2210 and 2230 are interfaced to second RTSA 2220, which is connected to a network 2240, and to the network 2240. Second RTSA 2220 provides the clock to first and third RTSAs 2210 and 2230 therefore synchronizing these devices to the second RTSA 2220. The scan list of up to 1024 center frequencies in each of the first to third RTSAs 2210 to 2230 may be provided to each RTSA individually via network 2240 or coordinated through second RTSA 2220. Likewise the events/triggers/data which are communicated to the remote control system, not shown for clarity, may be communicated directly from each of the RTSAs or coordinated through second RTSA 2220.

Accordingly as shown in spectrum 2250 the three RTSAs step according to the predetermined center frequency list such that first RTSA 2210 for example steps from 150 MHz, 250 MHz, 4550 MHz, and 1850 MHz; second RTSA 2220 steps from 1850 MHz, 1950 MHz, 1850 MHz, and 1950 MHz; and third RTSA 2230 steps from 6550 MHz, 7850 MHz, 150 MHz, and 2050 MHz. Each RTSA in stepping from one frequency to another configures the associated RF antenna and RF front-end processing selector circuit, such as RF selector 710, in FIG. 7 together with local oscillator such as LO circuit 720 which determines down-conversion in the RF processing blocks that operate on the upper RF ranges of the RTSA, such as High RF Processing Block 730 (operating 3.0 GHz-8.0 GHz in an embodiment of the invention) and Mid RF Processing Block 740 (operating 400 MHz-4400 MHz), Demodulator 780A, and Processor 780B. Additionally, the internally settings of the RTSA for the RF processing elements may be dynamically adjusted in dependence upon the center frequency of the RTSA according to the parameter configurations stored within the internal memory of the RTSA. For example, the settings of some circuit elements in High RF Processing Block 730 may be adjusted if the center frequency lies within 4 Ghz-5 GHz as opposed to 6 Ghz-8 GHz. Likewise the characteristics of the filters, multiplexers, operational amplifiers, low noise amplifiers, etc. may be adjusted in response to the center frequency setting of the RTSA or other factors determined by the RTSA locally or from a remote controller. Likewise, a switchable filter array such as filter bank 1010 with dual 1:8 switches 1005 and 1015 in FIG. 10 may be replaced by a fast variable filter with adjustable center frequency and band-pass characteristics, such as those employing combines for example.

Similarly the discrete filters, such as filter 1110 in high RF processing circuit 1100 and bandpass filter 1510 in mid-RF processing circuit 1500, may be dynamic, in terms of center frequency and band-pass characteristics, whilst amplifiers such as first and second amplifiers 1520 and 1530 in mid-RF processing circuit 1500 and cascaded first and second gain stages 1120 and 1130 in low RF processing circuit 1100 may be dynamically adjustable in gain applied.

It would be evident to one skilled in the art that the partitioning of the RF front end, such as presented supra in respect of FIGS. 7 through 19 may be varied according to a number of factors, including but not limited to, the operational frequency range of the RTSA, application of RTSA, speed of RTSA, instantaneous bandwidth of RTSA, anticipated density of transmitters, etc. Further, the number of DDC and FFT circuits may be varied either discretely or in conjunction with adjustments in the RF selector 710 and RF combiner 780.

For example discrete multiple FFT circuits may be provided with a wideband processing of received RF signals, for example by providing 200 MHz bandwidth, and dual FFT circuits processing 100 MHz spectral regions selected through filtering or dual DDC circuits may be provided to decimate a processed RF signal to different levels or select different channels. Alternatively, with modified RF selector 710 and RF combiner 780 circuits a RTSA with dual FFT circuits might be processing a first 100 MHz bandwidth slice centered at 2.45 GHz, a second 100 MHz bandwidth slice centered at 5.4 GHz, and a DDC processing a channel from a bandwidth slice at 1.85 GHz.

Within the embodiments described above in respect of FIGS. 6A through 22 have been discussed with respect to a RTSA processing signals from a lower frequency limit $f_{LOW}$=0.10 MHz to an upper frequency limit $f_{HIGH}$=8.0 GHz it would be evident that the RTSA may be extended for example by adding a Very-High RF Processing Block such as one operating from 6 GHz to 18 GHz and thereby overlapping with the 6 GHz to 8 GHz portion of the High RF Processing Block. Further whilst the overlapping regions have been presented as contiguous with each respective processing block frequency range it would be evident to one skilled in the art that the overlapping region may be in some embodiments of the invention be discontinuous to the remainder of the frequency range processed by each processing block. Further within other embodiments a frequency range being monitored by the RTSA may overlap the frequency ranges of three or more processing blocks rather than the two presented within the embodiments described above.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
    providing a plurality of input terminals, each input terminal receiving RF signals within a first predetermined portion of a predetermined frequency range; and
    providing a plurality of RF processing circuits connected to the plurality of input terminals, each RF processing circuit performing a predetermined processing function on a second predetermined portion of the predetermined frequency range,
    wherein each of the plurality of second predetermined portions of the predetermined frequency range comprise a first predetermined sub-set of frequencies that are the same as a second predetermined sub-set of frequencies within another one of the plurality of second predetermined frequency ranges,
    providing the plurality of RF processing circuits comprises providing a direct-conversion receiver as one of the plurality of RF processing circuits, the direct-conversion receiver operating with a local oscillator having a frequency approximately the same as the centre frequency of the second predetermined portion of the predetermined frequency range associated with the one of the plurality of RF processing circuits, and
    another RF processing circuit of the plurality of RF processing circuits at least one of:
    down-converts and up-converts the associated second predetermined portion of the predetermined frequency range to an intermediate frequency that lies within the second predetermined portion of the predetermined frequency range of the direct-conversion receiver; and
    down-converts and up-converts a plurality of subsets of the associated second predetermined portion of the predetermined frequency range to a plurality of intermediate frequencies that lie within the second predetermined portion of the predetermined frequency range of the direct-conversion receiver.

2. The method according to claim 1, wherein each RF processing circuit of the plurality of RF processing circuits processes all signals within the associated second predetermined portion of the predetermined frequency range simultaneously.

3. The method according to claim 1, wherein providing the plurality of RF processing circuits comprises providing one RF processing circuit comprising an intermediate frequency filter bank comprising a plurality of selectable IF filters, each selectable IF filter being characterized by a centre frequency and a bandwidth and rejecting signals outside its bandwidth.

4. A device comprising:
    a plurality of input terminals, each input terminal receiving RF signals within a first predetermined portion of a predetermined frequency range; and
    a plurality of RF processing circuits connected to the plurality of input terminals, each RF processing circuit performing a predetermined processing function on a second predetermined portion of the predetermined frequency range,
    wherein each of the plurality of second predetermined portions of the predetermined frequency range comprise a first predetermined sub-set of frequencies that are the same as a second predetermined sub-set of frequencies within another one of the plurality of second predetermined frequency ranges,
    the plurality of RF processing circuits comprises providing a direct-conversion receiver as one of the plurality of RF processing circuits, the direct-conversion receiver operating with a local oscillator having a frequency approximately the same as the centre frequency of the second predetermined portion of the predetermined frequency range associated with the one of the plurality of RF processing circuits, and
    another RF processing circuit of the plurality of RF processing circuits at least one of:
    down-converts and up-converts the associated second predetermined portion of the predetermined frequency range to an intermediate frequency that lies within the second predetermined portion of the predetermined frequency range of the direct-conversion receiver; and
    down-converts and up-converts a plurality of subsets of the associated second predetermined portion of the predetermined frequency range to a plurality of intermediate frequencies that lie within the second predetermined portion of the predetermined frequency range of the direct-conversion receiver.

5. The device according to claim 4, wherein each RF processing circuit of the plurality of RF processing circuits processes all signals within the associated second predetermined portion of the predetermined frequency range simultaneously.

6. The device according to claim 4, wherein providing the plurality of RF processing circuits comprises providing one RF processing circuit comprising an intermediate frequency filter bank comprising a plurality of selectable IF filters, each selectable IF filter being characterized by a centre frequency and a bandwidth and rejecting signals outside its bandwidth.

7. A device comprising:
   a plurality of input terminals, each input terminal receiving RF signals within a first predetermined portion of a predetermined frequency range; and
   a plurality of RF processing circuits connected to the plurality of input terminals, each RF processing circuit performing a predetermined processing function on a second predetermined portion of the predetermined frequency range,
   wherein each of the plurality of second predetermined portions of the predetermined frequency range comprise a first predetermined sub-set of frequencies that are the same as a second predetermined sub-set of frequencies within another one of the plurality of second predetermined frequency ranges,
   the plurality of RF processing circuits comprises providing a direct-conversion receiver as one of the plurality of RF processing circuits, the direct-conversion receiver operating with a local oscillator having a frequency approximately the same as the centre frequency of the second predetermined portion of the predetermined frequency range associated with the one of the plurality of RF processing circuits, and
   another RF processing circuit of the plurality of RF processing circuits at least one of down-converts and up-converts a predetermined portion of the associated second predetermined portion of the predetermined frequency range to within the second predetermined portion of the predetermined frequency range of the direct-conversion receiver.

8. The device according to claim 7, wherein the predetermined portion of the associated second portion of the predetermined frequency range is converted to intermediate frequencies that lie within the second predetermined portion of the predetermined frequency range of the direct-conversion receiver.

9. The device according to claim 7, wherein the predetermined portion of the associated second portion of the predetermined frequency range is a plurality of subsets of the associated second predetermined portion of the predetermined frequency range wherein each of the plurality of subsets of the associated second predetermined portion of the predetermined frequency range are converted to a plurality of intermediate frequencies that lie within the second predetermined portion of the predetermined frequency range of the direct-conversion receiver.

10. The device according to claim 7, wherein each RF processing circuit of the plurality of RF processing circuits processes all signals within the associated second predetermined portion of the predetermined frequency range simultaneously.

11. The device according to claim 7, wherein providing the plurality of RF processing circuits comprises providing one RF processing circuit comprising an intermediate frequency filter bank comprising a plurality of selectable IF filters, each selectable IF filter being characterized by a centre frequency and a bandwidth and rejecting signals outside its bandwidth.

* * * * *